US006591250B1

(12) United States Patent
Johnson et al.

(10) Patent No.: US 6,591,250 B1
(45) Date of Patent: Jul. 8, 2003

(54) SYSTEM AND METHOD FOR MANAGING VIRTUAL PROPERTY

(75) Inventors: Michael T. Johnson, Derry, NH (US); George P. Moromisato, Cambridge, MA (US)

(73) Assignee: Genetic Anomalies, Inc., Cambridge, MA (US)

( * ) Notice: Subject to any disclaimer, the term of this patent is extended or adjusted under 35 U.S.C. 154(b) by 0 days.

(21) Appl. No.: 09/253,167

(22) Filed: Feb. 15, 1999

Related U.S. Application Data

(60) Provisional application No. 60/075,518, filed on Feb. 23, 1998.

(51) Int. Cl.[7] ............................ G06F 12/14; G06F 17/60
(52) U.S. Cl. ............................ 705/51; 705/3; 380/30; 713/176
(58) Field of Search ............................ 713/200; 705/37

(56) References Cited

U.S. PATENT DOCUMENTS

| | | | | |
|---|---|---|---|---|
| 4,378,118 A | 3/1983 | Leonardi, Jr. | | 273/292 |
| 4,552,360 A | 11/1985 | Bromley et al. | | 463/38 |
| 4,569,526 A | 2/1986 | Hamilton | | 273/242 |
| 4,613,134 A | 9/1986 | Tobin | | 273/242 |
| 5,125,671 A | 6/1992 | Ueda et al. | | 463/33 |
| 5,184,830 A | 2/1993 | Okada et al. | | 463/29 |
| 5,356,151 A | 10/1994 | Abecassis et al. | | 273/243 |
| 5,359,510 A | 10/1994 | Sabaliauskas | | 700/91 |
| 5,393,062 A | 2/1995 | Cember | | 273/153 |
| 5,409,234 A | 4/1995 | Bechter | | 273/241 |
| 5,498,003 A | 3/1996 | Gechter | | 461/31 |
| 5,664,998 A | 9/1997 | Seelig et al. | | 463/20 |
| 5,672,131 A | 9/1997 | Osborne et al. | | 473/527 |
| 5,704,837 A | 1/1998 | Iwasaki et al. | | 463/38 |
| 5,774,125 A | 6/1998 | Suzuoki et al. | | 345/582 |
| 5,809,144 A | * 9/1998 | Sirbu et al. | | 380/25 |
| 5,850,442 A | * 12/1998 | Muftic | | 380/21 |
| 5,872,973 A | 2/1999 | Mitchell et al. | | 709/332 |
| 6,009,458 A | 12/1999 | Hawkins et al. | | 709/203 |
| 6,119,229 A | * 9/2000 | Martinez et al. | | 713/200 |
| 6,226,412 B1 | * 5/2001 | Schwab | | 382/232 |

FOREIGN PATENT DOCUMENTS

| | | | | |
|---|---|---|---|---|
| EP | 0 588 625 A1 | 3/1994 | | |
| GB | 2 092 796 A | 8/1982 | | A63F/9/22 |
| GB | 0650124 A1 | * 10/1993 | | G06F/12/10 |
| US | PCT/US98/11680 | * 7/1998 | | G06F/12/02 |

OTHER PUBLICATIONS

Applied Cryptography, Bruce Schneier,John Wiley & Sons, Inc., Second Edition, 1996, pp. 31–32.*
Applied Cryptology, Cryptographic Protocals, and Computer Security Models, vol. 29, Proceedings of Symposia in Applied Mathematics American Mathematical Society.*
Microsoft Computer Dictionary Fourth Edition,–Microsoft Press Copyright 1999, pp. 69,187.*
Business Wire, Baltimore technologies Announces X/Secure; The first Commercial Prodduct to Secure XML Systems for e–business, Aug. 9, 1999, 1028 words.*
K. O'Connell, V. Cahill, A. Condon, S. McGerty, G. Starovic, B. Tangney: "The Void Shell, A Toolkit for The Development of Distributed Video Games and Virtual Worlds" *Proceedings of First Workshop on Simulation and Interaction in Virtual Environments*, Jul. 13–15, 1995, pp. 172–177, XP002089776.

(List continued on next page.)

*Primary Examiner*—James P. Trammell
*Assistant Examiner*—Daniel L. Greene
(74) *Attorney, Agent, or Firm*—Wolf, Greenfield & Sacks, P.C.

(57) ABSTRACT

A system and method for managing virtual property is disclosed. In the system, virtual items are each represented by one or more digital objects and are managed by one or more computer systems functioning as an owner, broker, authenticator and provider.

43 Claims, 14 Drawing Sheets

OTHER PUBLICATIONS

A. Bowling: "OMT and the Game of War" *Journal of Computing in Small Colleges*, vol. 10, Jan. 1995, pp. 73–83, XP002089777.

S. Roti, "How Indexes and Other Tricks Can Help—or Hinder—Your Performance Tuning Efforts," *Indexing and Access Mechanisms*, DBMS, May 1996, pp. 1–6.

* cited by examiner

OWNER

| OWNER DATA | |
|---|---|
| OwnerID | Information that uniquely identifies owner, e.g. a unique number. |
| Key | Secret key value used to encrypt and authenticate communications. |
| Digest | Value that is a compressed representation of the owner's collection. |
| Collection | An optional list of individual items belonging to the owner. |

| COLLECTION DATA | |
|---|---|
| OwnerID | Information that uniquely identifies owner, e.g. a unique number. |
| ItemType | Type of virtual property, defined by provider, e.g., virtual trading card. |
| ItemID | A specific item within an ItemType. |
| ItemCount | Number of this item in owner's collection. |
| BinaryData | Data associated with the collectible item such as images or programs. |

FIG. 5C

# SYSTEM AND METHOD FOR MANAGING VIRTUAL PROPERTY

RELATED APPLICATION

This application claims the benefit under Title 35, U.S.C. §119(e) of co-pending U.S. Provisional Application Ser. No. 60/075,518, filed Feb. 23, 1998, entitled "SYSTEM AND METHOD FOR MANAGING VIRTUAL PROPERTY" by Michael T. Johnson and George P. Moromisato, the contents of which are incorporated herein by reference.

FIELD OF THE INVENTION

This invention relates to a system and method for managing virtual property, more particularly, for managing virtual property over a distributed computer system.

BACKGROUND OF THE RELATED ART

With the advance of the Internet and networking technologies, a need has developed for conducting secure business transactions between distributed computer systems. These systems are typically connected through a communications network. Such a network may be, for example, a public network like the Internet or a semi-private network such as a corporate Intranet. Systems on these networks may be subject to types of attacks that may compromise or destroy data communicated between these systems. To combat these attacks, encryption technologies have been developed. Currently, computer systems implementing encryption technologies are available which allow computers to transmit secure information such as credit card information over non-secure networks such as the Internet to conduct purchases. Because private purchases may now be executed over public networks, electronic commerce has recently become popular for consumer transactions for purchasing virtual property.

Virtual property in a software construct may be a digital object or other software token that represents actual property or serves as a substitute for actual property in certain transactions. Actual property may include stocks, bonds, or any other real, tangible, or intangible property. Both virtual property and paper instruments such as a check represent actual property. Unfortunately, these cryptographic systems are also subject to attacks that may compromise the security of their transactions.

There are conventional systems which allow a user to perform secure electronic transactions between distributed computer systems. For example, the Cryptolopes system from IBM provides such a system (Cryptolopes is a registered trademark of International Business Machines, Inc.). The Cryptolopes system uses a complex rights management language to perform transactions. This system uses public-key cryptography to encode transactions and uses digital signatures to create digitally-signed digital objects which may be purchased by a user as virtual property. These digitally-signed objects may be, for example, checks, bonds, or any representation of real property that may be purchased through the system.

Such a system can be prohibitively expensive when the system supports a large number of digitally-signed digital objects because each of the digital objects are stored on the system. In particular, the objects are stored in their entirety at the centralized server such that the items cannot be forged because they are not transmitted to clients over the network. Thus, the server would require a large storage system and would require a high-performance computer system to track all of the objects.

SUMMARY OF THE INVENTION

The invention is generally directed to a system and method for managing virtual property over a distributed computer system in a secure manner.

In one aspect of the invention, a system is provided for managing virtual property represented by an identification of items and associated data, including a plurality of processes executing on one or more computer systems which exchange a digest, wherein the digest is a compressed representation of the virtual property. In another aspect, the digest is determined by performing a hashing function on an index of the virtual property. In another aspect, the index is an array of virtual property items. In another aspect, the hashing function is an MD5 hashing function.

In another aspect, a system is provided for managing virtual property including one or more computer systems functioning as owner, authenticator, and provider systems, the system comprising a plurality of owners each having a collection of one or more virtual items, wherein each collection has an associated digest, the digest being a compressed representation of an owner's collection, an authenticator including a database of digests, and a provider which is configured to conduct a transaction with the one of the plurality of owners on the basis of a comparison between the digest of the authenticator database and the digest of the owner.

In another embodiment of the invention, a system is provided for managing virtual property including one or more computer systems functioning as owner, authenticator, and provider systems, the system comprising an owner having a collection of one or more virtual items and determining a digest according to the collection, an authenticator including a database storing the digests of said plurality of owners, and a provider which is configured to sell one or more items to one of the plurality of owners and which determines a calculated digest from a transmitted collection of virtual items when the calculated digest matches a digest stored in the database associated with the one owner.

In another embodiment of the invention, a method is provided for managing a collection of virtual items belonging to an owner and having an index associated therewith, the method comprising the steps of determining a digest by performing a hash function on the index, sending the digest to a provider, verifying the digest with an authenticator, and conducting a transaction session between the provider and the owner. In another aspect of the invention, the step of determining includes a step of performing an MD5 hashing function on the index. In another aspect, the index is an array of virtual items. In another aspect, the index is a concatenation of a plurality of virtual item indices.

In another embodiment of the invention, a method is provided for conducting transactions over a distributed network, the method comprising steps of a) authenticating an owner system to a provider system, b) verifying the virtual property of the owner by performing steps of 1) computing a digest of a collection of virtual property, 2) comparing the digest to a predetermined digest which tracks the collection, the predetermined digest being stored in a database of digests, and c) permitting the owner to perform a transaction involving the collection.

In another embodiment of the invention, a method is provided for computing a digest from a collection of virtual property items, the method comprising steps of combining indices associated with each of the virtual property items into a pre-hash index and performing a hashing function on the pre-hash index to obtain the digest.

In another embodiment of the invention, a method is provided for computing a digest from a collection of virtual property items, the method comprising the steps of storing virtual property items in a database and performing a hashing function on the database to obtain the digest.

In another embodiment of the invention, a digital information product is provided containing a data structure representing a plurality of virtual property items having a plurality of indices, wherein the data structure is created from a pre-hash index, the pre-hash index being formed by one or more of the plurality of indices of virtual property, and wherein the data structure is formed by performing a hashing function on the pre-hash index. In another aspect, the data structure has a fixed length. In another aspect, the hashing function is an MD5 hashing function. In another aspect, the data structure is determined for a subset of the plurality of virtual property items. In another aspect, the pre-hash index is formed by a concatenation of one or more of the plurality of indices of virtual property. In another aspect, the pre-hash index is a database of virtual items.

In another aspect, a method is provided for conducting transactions over a distributed network including one or more computer systems functioning as an owner, authenticator, and provider systems, the method comprising steps of a) indicating, by a first owner, a second owner with whom to trade, b) indicating a trade defining a first set of one or more virtual property items offering to trade and a second set of one or more items which are expected in return for the first set, and c) after both the first and second owner indicate that they wish to trade, confirming that both the first and second owner wish to execute the trade.

In another embodiment of the invention, a system is provided for managing virtual property including one or more computer systems functioning as owner, authentication, and provider systems, the system comprises a plurality of owners each having a collection of one or more virtual items, wherein each collection has an associated digest, the digest being a compressed representation of an owner's collection and an authenticator including a database of digests and configured to authenticate the owner system to another system.

Further features and advantages of the present invention as well as the structure and operation of various embodiments of the present invention are described in detail below with reference to the accompanying drawings.

BRIEF DESCRIPTION OF THE DRAWINGS

In the drawings, like reference numerals indicate identical or functionally similar elements. Additionally, the left-most digit of a reference numeral identifies the drawing in which the reference numeral first appears. In the accompanying drawings:

FIG. 5C is a block diagram showing data formats used by an owner according to various aspects of the invention;

DETAILED DESCRIPTION

The present invention will be more completely understood through the following detailed description which should be read in conjunction with the attached drawings in which similar reference numbers indicate similar structures. All references cited herein are hereby expressly incorporated by reference.

Figure 1:
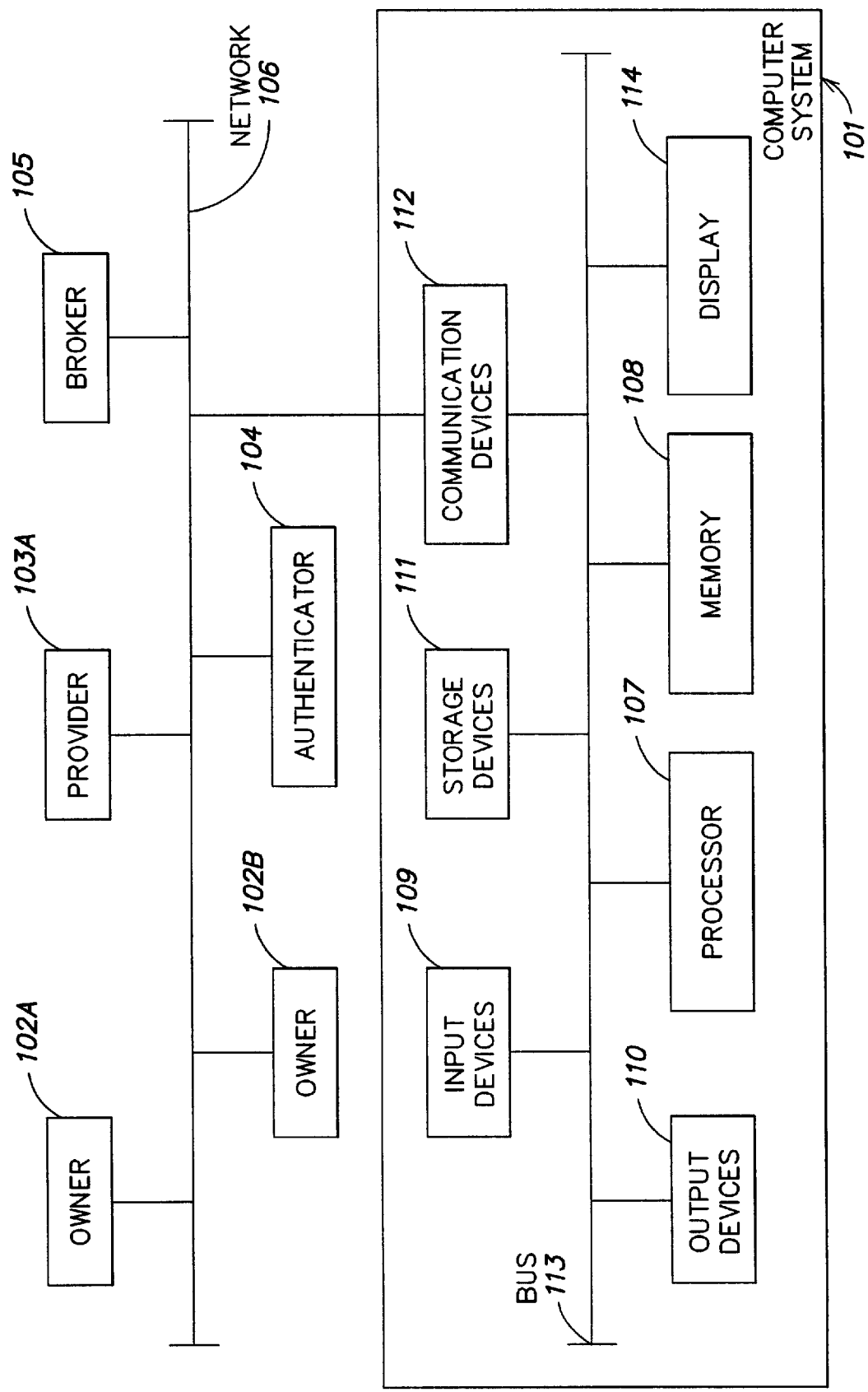
FIG. 1 is a block diagram of an example computer system suitable for implementing the invention.

An example computer system which may be used to practice the present invention is depicted in FIG. 1. The computer system 101 includes a processor 107 connected to one or more storage devices 111, such as a disk drive. The computer system also includes one or more output devices 110, such as a monitor or graphic display 114, or printing device (not shown). The computer system 101 typically includes a memory 108 for storing programs and data during operation of the computer system 101. In addition, the computer system may contain one or more communication devices 112 that connect the computer system to a communication network 106.

Computer system 101 may be a general purpose computer system that is programmable using a high level computer programming language. The computer system may also be implemented using specially programmed, special purpose hardware. In the computer system 101, the processor 107 is typically a commercially available processor, such as the PENTIUM or PENTIUM II microprocessor from the Intel Corporation, PowerPC microprocessor, SPARC processor available from Sun Microsystems, or 68000 series microprocessor available from Motorola. Many other processors are available. Such a processor usually executes an operating system which may be, for example, DOS, WINDOWS 95, WINDOWS 98, WINDOWS NT or WINDOWS 2000 available from the Microsoft Corporation, MAC OS SYSTEM 7 available from Apple Computer, SOLARIS available from Sun Microsystems, NetWare available from Novell Incorporated, or UNIX available from various sources.

The communication network 106 may be an ETHERNET network or other type of local or wide area network (LAN or WAN), a point-to-point network provided by telephone services, or other type of communication network or combination of networks. Information consumers and providers, referred to as client and server systems, respectively, communicate through the network 106 to exchange information.

A client system may function as an owner system 102 which is a system that may provide an interface to a user of the distributed computer system. The user may operate the owner system 102 to perform one or more transactions involving virtual property. Generally, a user acting through or together with an owner system 102 will be referred to hereinafter simply as an owner system 102. The user, through the owner system 102, performs transactions such as buying, selling, trading, and consigning property through network 106.

Computer system 101 may be configured to perform as an owner 102, provider 103, authenticator 104, or broker 105 system on the network 106. It should be understood that one or more of the owner 102, provider 103, and authenticator 104 systems may be implemented on a same computer system. Provider system 103 may offer a number of services to owner system 102. For example, the provider system 103 typically may allow owner systems 102 (by direction of their users) to buy, sell, and virtual items. The authenticator system 104 may keep track of collections of items which are owned by users operating the owner systems 102. The provider system 103 may contact the authenticator system 104 to determine whether a particular user operating an owner system 102 actually owns virtual items. The broker system 105 may trade virtual items between provider systems 103, owner systems 102, or between any type of system that may own or execute sales on behalf of another system.

Owner 102, provider 103, authenticator 104, and broker 105 systems may be implemented as software which is executed on a general-purpose computer system 101. One or more processes may be created on the system as a result of executing the software. A process is generally a software program that is being executed. More specifically, a process is an execution context that is allocated resources such as memory, time, and files. Any of the processes in these owner 102, provider 103, authenticator 104, and broker 105 systems may be manually operated, automatic, or supervised. For example, an owner system 102 may be operated by a user, and an authenticator may operate automatically or in a manually supervised mode using any degree of manual intervention.

One or more of these systems may be located on a same computer system. It should be understood that the invention is not limited to a particular computer system platform, processor, processing methodology, operating system, or network. Also, it should be apparent to those skilled in the art that the present invention is not limited to a specific programming language or computer system and that other appropriate programming languages and other appropriate computer systems could also be used.

The present invention may be programed in an object-oriented programming language, such as SmallTalk, JAVA or C++. In object-oriented programming, code and data that are related may be combined into objects. An object is an instance of a software entity, i.e., a programming language construct, that embodies both specific data and the functions that manipulate it. In object-oriented programming, an object is an entity that has state, behavior and identity. Objects are created, or instantiated, during the execution of an object-oriented program wherein instances of objects are created. Objects may be related, as in a parent-child relationship, wherein features such as methods and/or data structures are inherited by a child object from a parent object. Objects are typically created in class hierarchies, and the methods and/or data structures of objects are inherited through the hierarchy. Other such relationships exist between objects, as is known to those skilled in the art. It should be understood that one or more embodiments of the present invention may be implemented in any object-oriented programming language suitable for authenticating clients with servers. In addition, embodiments of the invention may be implemented using functional programming.

Figure 2:
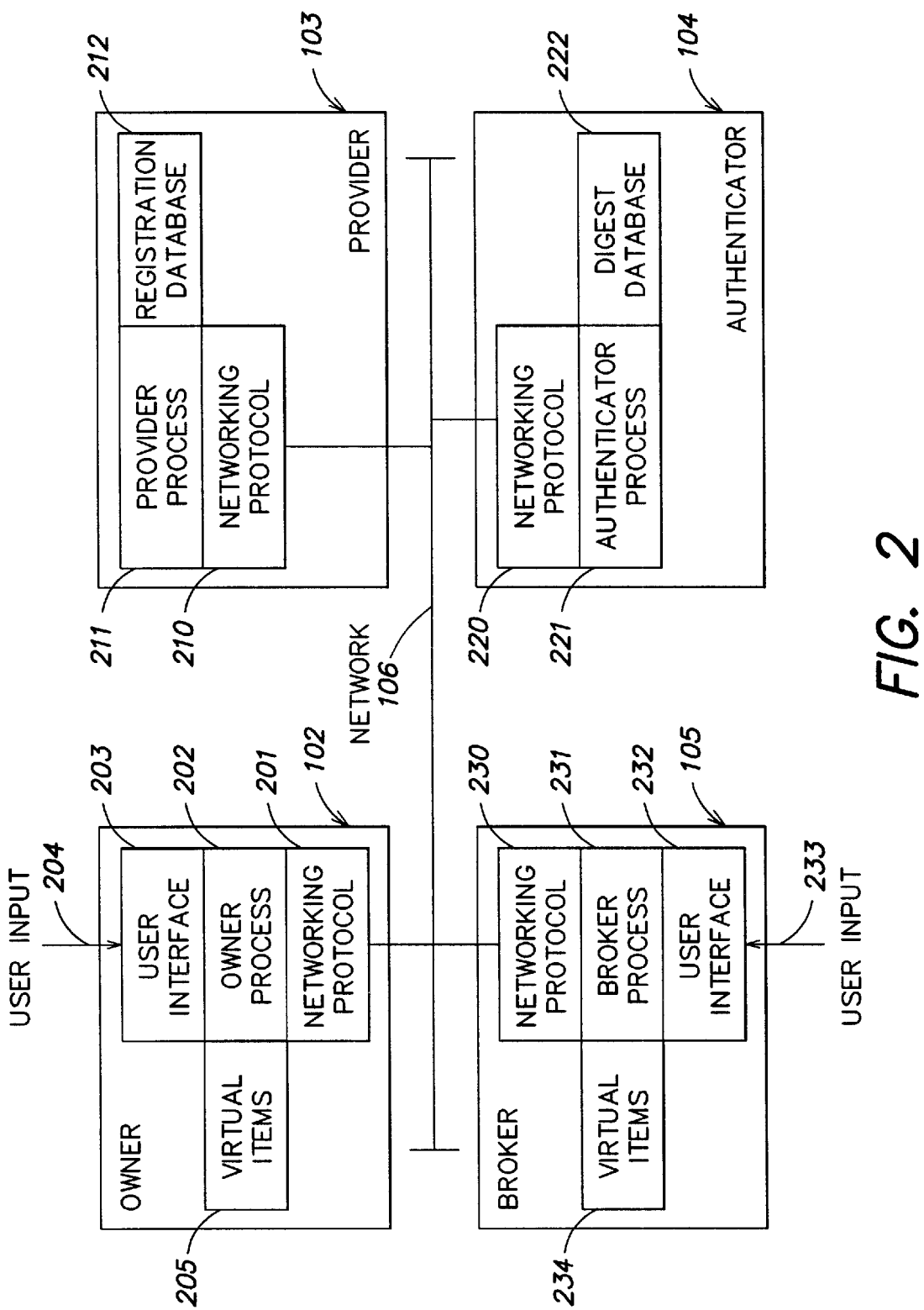
FIG. 2 is a block diagram of a distributed computer system embodying same aspects of the invention.

A more detailed block diagram of a client-server system implementing one embodiment of the present invention is shown in FIG. 2. An owner system 102 embodying aspects of the present invention typically includes a networking protocol 201 used by an application program to communicate with a provider 103, authenticator 104, and/or broker systems 105. As discussed above, a user may operate the owner system 102 to perform one or more transactions involving virtual property. Examples of a networking protocol 201 includes any version of the TCP/IP networking protocol, IPX networking protocol available from the Novell Corporation, or other networking protocol. The TCP/IP protocol is described with more particularity in *Internetworking with TCP/IP*, Volumes I–III, by D. E. Comer et al., and *TCP/IP Illustrated*, Volume I, by R. Stevens, Addison-Wesley (1994), which are incorporated herein by reference.

Owner system 102 includes an owner process 202 that communicates with authenticators, providers, and brokers, to purchase, trade, or authenticate virtual items 205. Virtual items 205 may be purchased or traded by owner system 102, and may be classified as virtual property. Virtual items 205 may represent tangible or intangible objects and privileges that may be owned by one or more persons or entities. In one embodiment, virtual items may be represented as object-oriented software objects.

In various aspects of the invention, virtual items 204 are transferred between systems over network 106. Unlike centralized systems, the virtual items 205 are stored at the owner 102 and broker 105 systems. Distributed storage of virtual property items reduces storage requirements of a central system that tracks virtual property items.

Typically, the virtual items 205 are owned by a user that operates an owner system 102. The user communicates with the owner system 102 through a user interface 203. User interface 203 may be, for example, a graphical user interface such as ones presented by the WINDOWS 95, WINDOWS 98, NT, or 2000 Operating Systems, X-Windows, Solaris, HPUX, or other user interface type. User interface 203 may also be an interface of an application program which is executed on the owner system 102. An example of such an application includes an Internet browser application, such as one provided by the Netscape Navigator Internet Browser or the Microsoft Internet Explorer Browser applications.

The user provides input 204 to user interface 203 to control the owner 102. The owner 102 generally communicates with providers 103, authenticators 104, and brokers 105 across network 106. Provider system 103 typically includes a networking protocol 210 used by provider process 211 to communicate with the owner and/or authenticator system 104. Examples of networking protocol 210 include the TCP/IP or IPX networking protocols as are known in the art. Other protocols may be used. Provider system 103 also includes a registration database 212 to store information regarding users operating owner 102 systems. Information may include user identification, passwords, information regarding virtual property items, and the like.

The system may include an authenticator system 104 which assists in performing transactions such as purchases and trades. Authenticator system 104 generally includes a networking protocol 220 that may also be TCP/IP. Authenticator 104 includes an authenticator process 221 which is used to track one or more types of virtual property on behalf of one or more provider systems 103 and their associated owner systems 102. Authenticator systems 104 generally track items 205 belonging to each owner 102. Authenticator 104 generally includes a digest database 222 used to store and retrieve digests described in more detail below. These digests are used by authenticator 104 to authenticate an owner's collection of virtual property items.

The system may also include providers 103 that define virtual property types and the context in which they have value. Providers may be for example, game servers, web sites, or other server types that offer virtual property to owners. Owners are typically the end-users of virtual property. An owner system 102 may be embodied by software which can be built into web browsers, stock trading software, or any application or operating system capable of communicating in a client-server relationship. The owner system 102 is typically operated by a user to perform transactions with virtual property.

Figure 3:
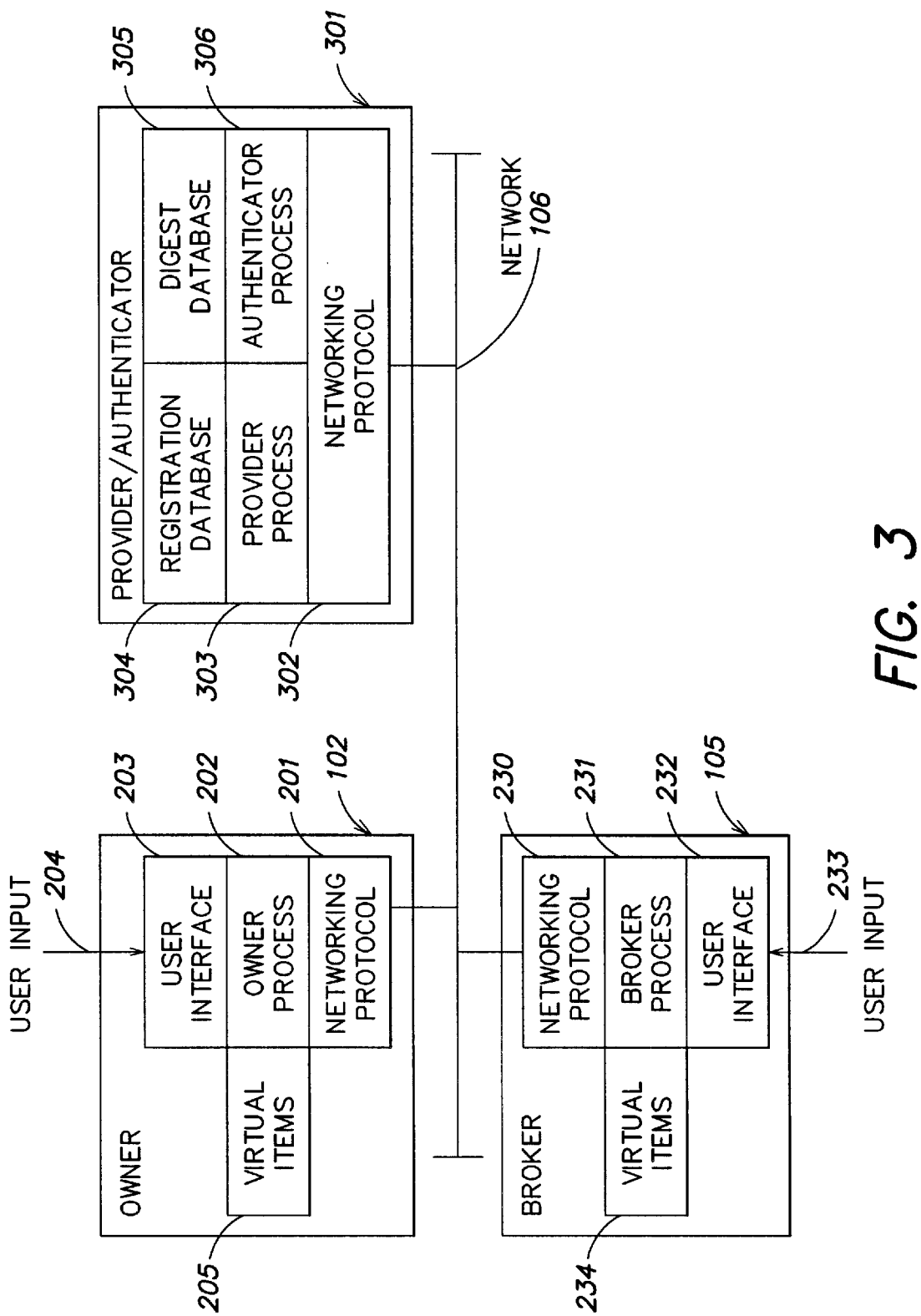
FIG. 3 is a block diagram showing a system for managing virtual property items embodying other aspects of the invention.

FIG. 3 shows a block diagram of another client-server system implementing one embodiment of the invention wherein the provider 103 and authenticator are co-located on the same system 301. Provider process 303 and authenticator process 306 may be the same or different processes on system 301. If processes 303 and 306 are different processes having different resource allocations in system 301, the processes 303, 306 may communicate using interprocess communication as is well-known in the art. System 301 may include a registration database 304 and digest database 305 similar to databases 212 and 222, respectively.

Figure 4:
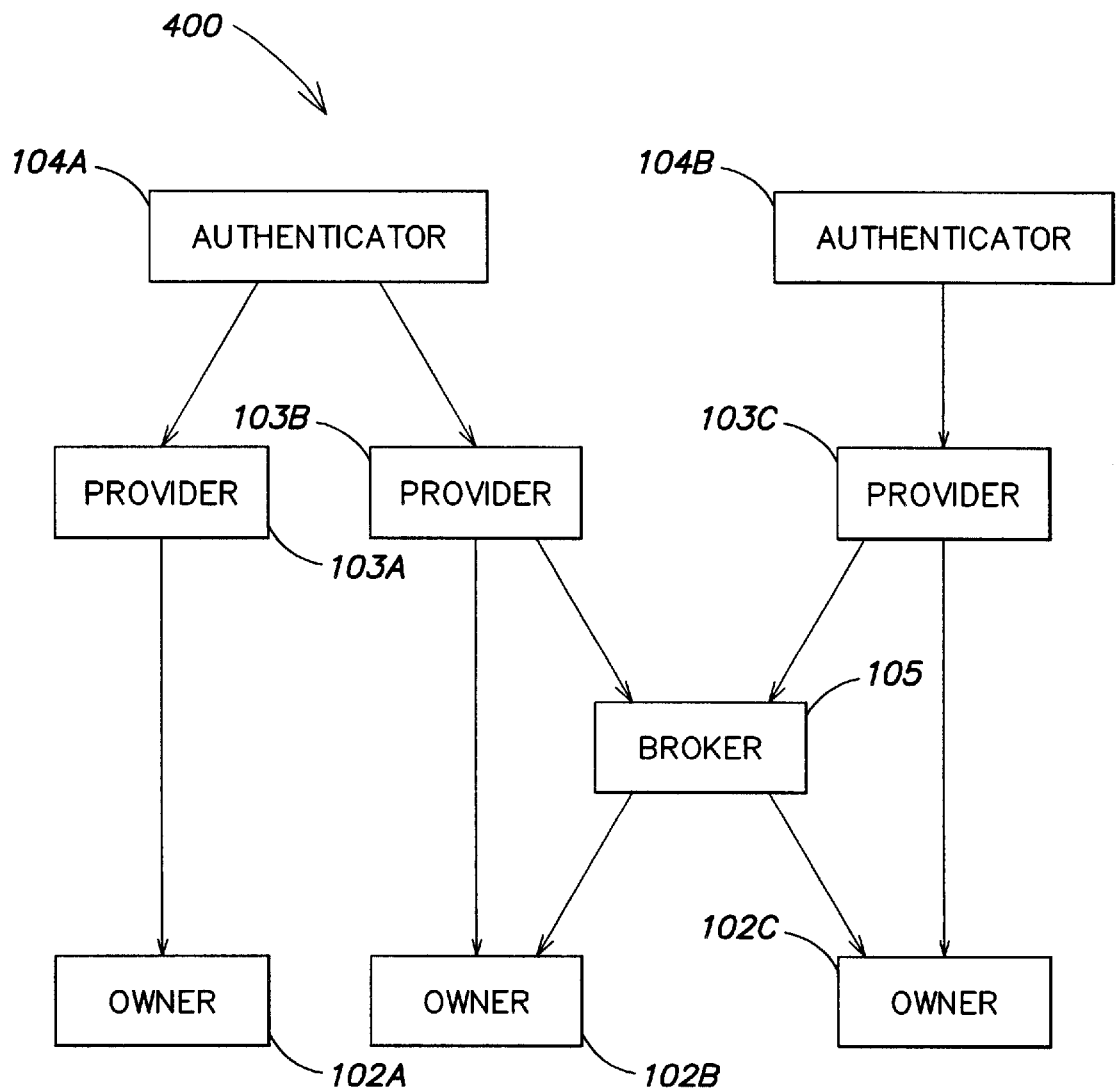
FIG. 4 is a block diagram showing a system for managing virtual property items embodying other aspects of the invention.

FIG. 4 shows various relationships that an authenticator 104, provider 103, owner 102, and broker systems 105 can assume within a communications system 400. It should be understood that any combination of the owner 102, provider 103, authenticator 104, and broker systems 105, can be located on any system. Generally, an owner 102 may communicate to either a provider 103 or a broker 105 to purchase or trade virtual property items 205. To purchase or trade an item, an authenticator 104 may be referenced by another system such that the authenticator verifies the virtual property items 205 to ensure that the property items 205 are authentic. Once an authenticator 104 has determined that virtual property items 205 are authentic, a provider 103 or broker 105 will permit a purchase or trade of a virtual property item.

As is shown in FIG. 4, owner 102A can purchase items directly from a provider 103A. An owner 102B can purchase items directly from provider 103B or sell virtual items through a broker 105. Similarly, owner 102C may purchase items directly from a provider 103C or purchase items consigned to broker 105.

Owners 102B and 102C may trade items through a provider 103 or broker system 105. When trading occurs, each user operating the owner systems 102B, 102C indicate an owner 102 with whom they wish to trade, property items that the user (operating through the owner system 102) is offering to be traded, and the property items that the user expects in return. When the provider 103 or the broker system 105 receives a valid request for a trade of virtual property items, the provider 103 or broker system 105 completes an exchange of virtual property items and transfers the virtual property items to the appropriate owner systems 102B, 102C using a communication protocol, such as TCP/IP.

The provider 103 or broker 105 systems may verify with each owner 102B, 102C that they confirm their portion of the trade. Each owner 102B, 102C may be given the option to review the transaction after it has been committed and cancel the transaction if they choose.

Brokers 105 may be used to trade items with owners 102, providers 103, or other brokers 105. A broker 105 may be implemented as software executing on a computer system. Broker 105 is a special type of owner system 102 that includes certain additional capabilities. For example, a broker 105 can buy and sell items from owner systems 102 and perform transactions that require owner systems 102 and provider systems 103 to consign their goods with a third party.

Brokers 105 may also act as a mediator between different systems using separate authenticators. For example, the broker system 105 may be separate from a provider 103 and authenticator 104, and may provide trading services or offer other types of compensation in exchange for virtual items. For example, the virtual items may be virtual trading cards, and the broker 105 may allow a user to trade virtual trading cards for physical trading cards and vice versa.

Figure 10:
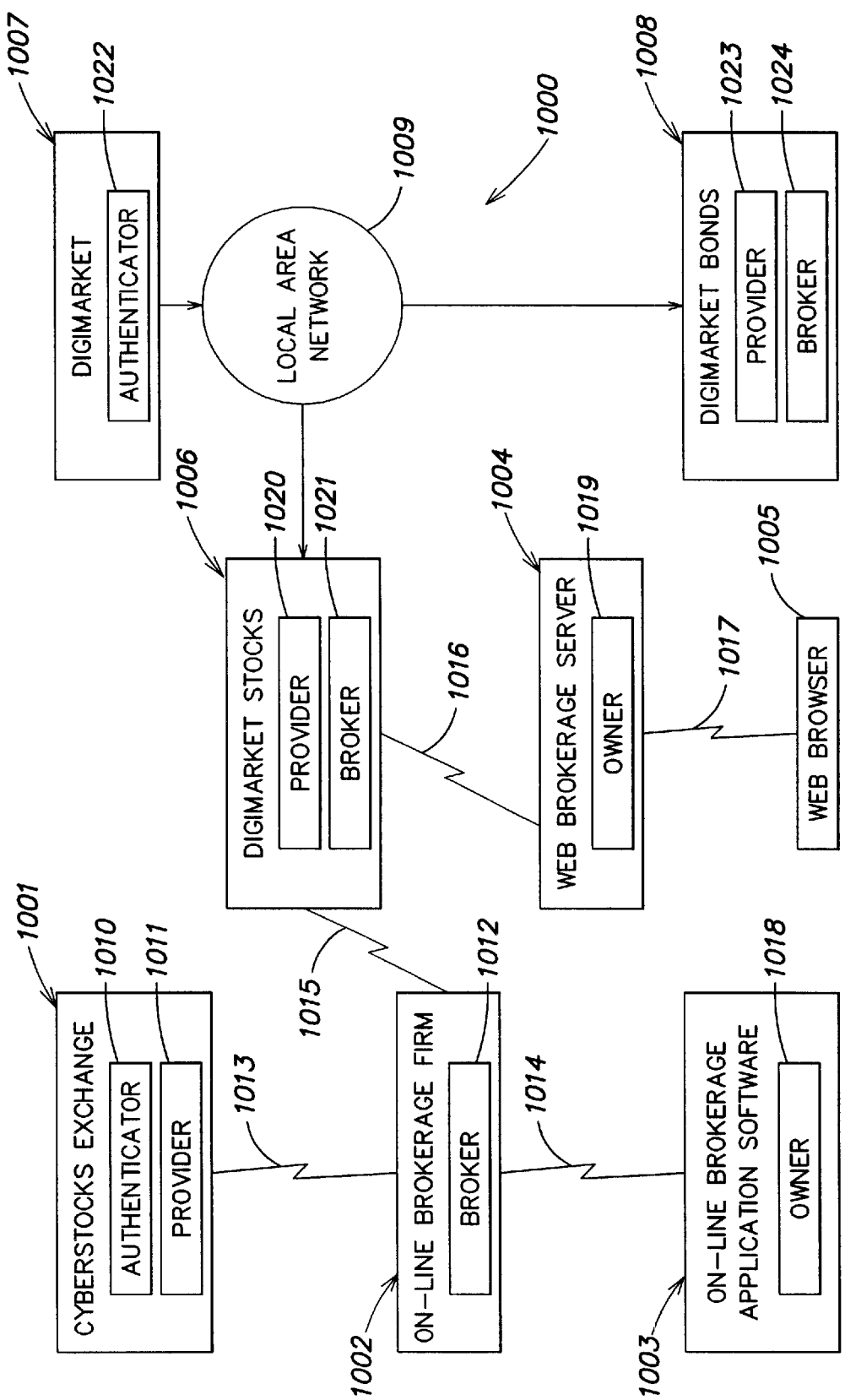
FIG. 10 is a block diagram of a system for managing virtual property items embodying other aspects of the invention.

A virtual property system may be used in any situation where goods or services are provided. In particular, a virtual property system would be beneficial in situations when a provider 103 needs to track potentially large numbers of virtual property items, and desires to allow the holders of the virtual property items to buy, sell, or exchange the items with others. Examples of virtual property systems may include:

a virtual reality game where players can own and use virtual property items, including a virtual trading card game (described below with reference to FIG. 11)

an on-line stock exchange (described below with reference to FIG. 10)

a digital cash system on-line coupons other systems using virtual property.

As discussed above, the authenticator 104 and provider 103 may be combined on a single machine and communicate directly in computer memory, or may be separate processes on a computer and communicate through interprocess communication. The authenticator 104 and provider 103 could also be separated and allowed to communicate through a public or private network. Also, it may be desired that the communication occur using secure communications. One might separate the authenticator 104 and provider 103 functions to separate systems to produce multiple providers 103 that share a common authenticator 104.

Figure 5A:
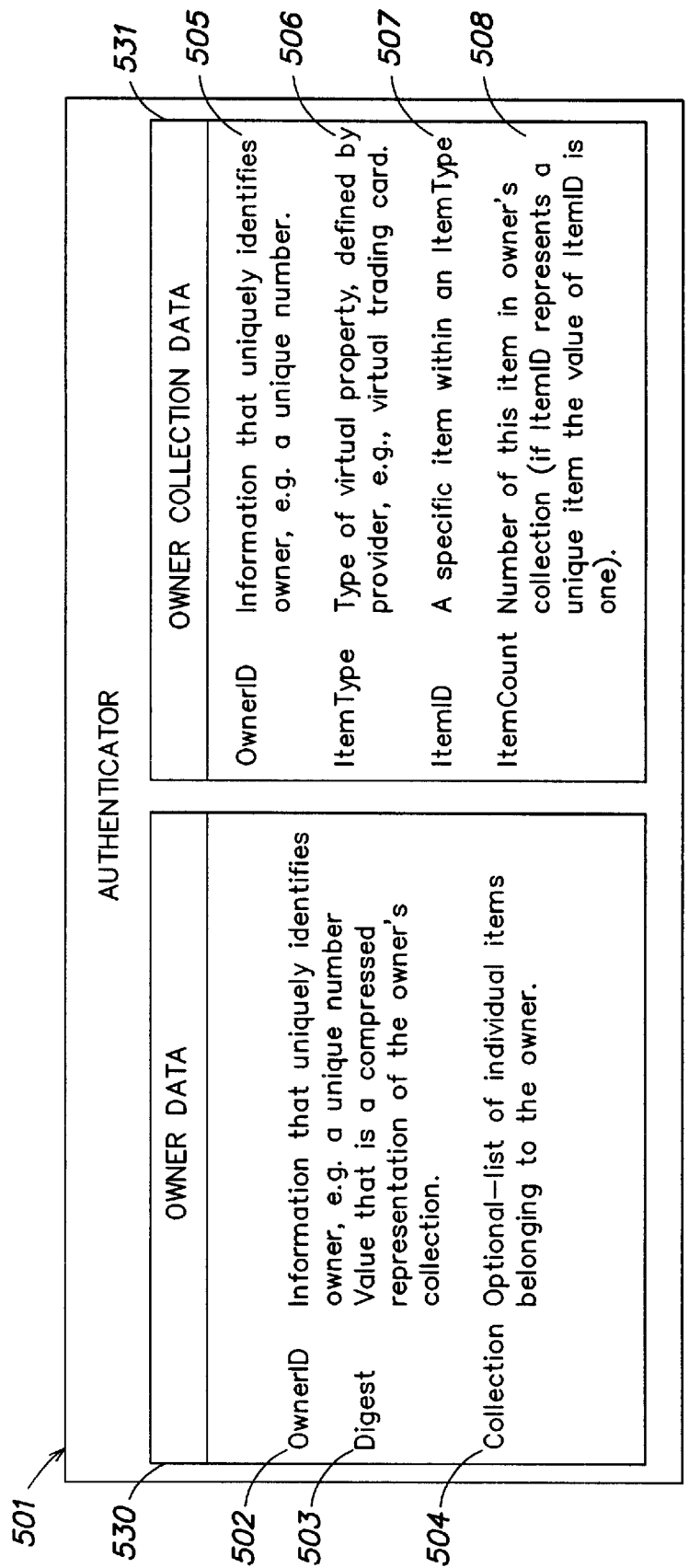
FIG. 5A is a block diagram showing data formats used by an authenticator according to various aspects of the invention.
Figure 5B:
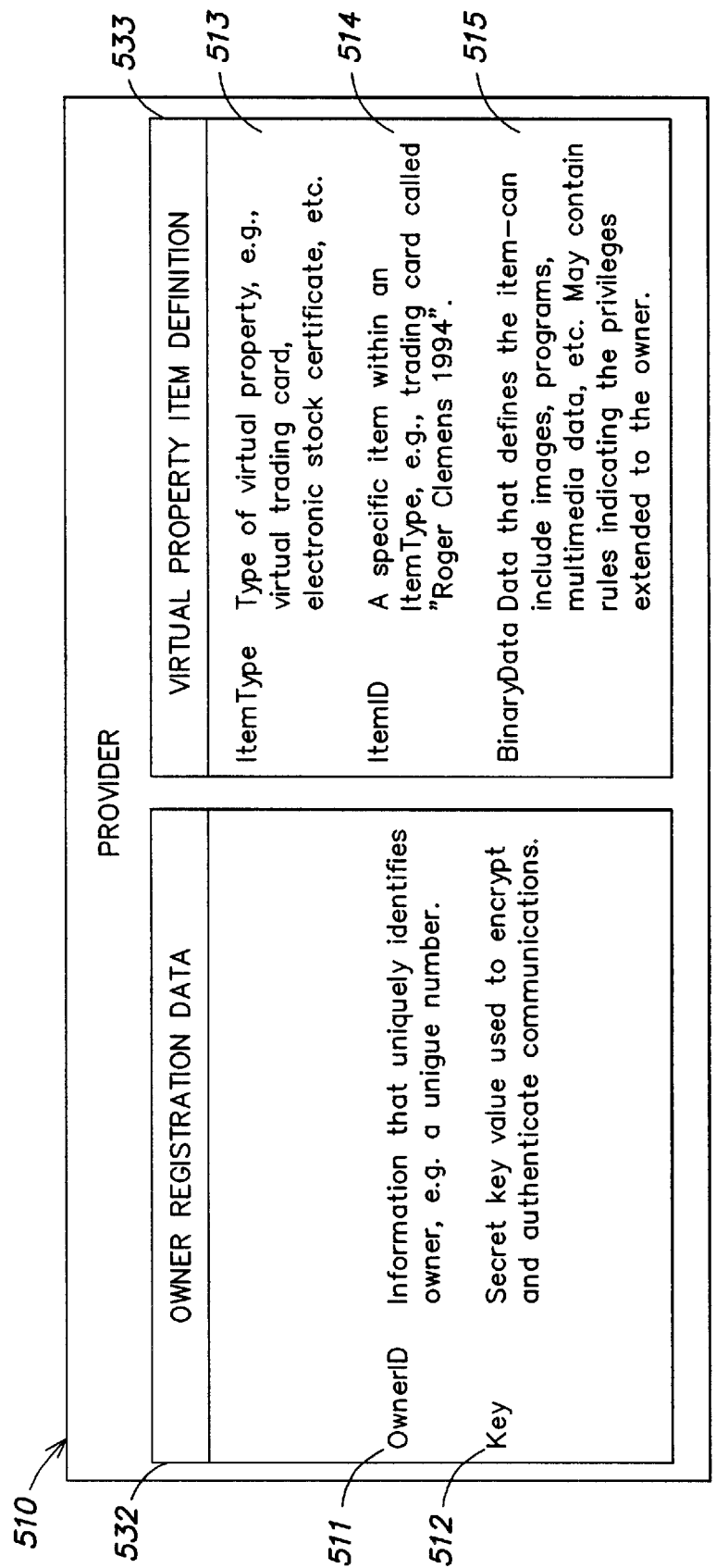
FIG. 5B is a block diagram showing data formats used by a provider according to various aspects of the invention.

FIGS. 5A–5C show basic data elements that may be used in virtual property transactions described in more detail below with reference to FIGS. 7, 8, 9A and 9B. In FIG. 5A, block 501 shows information elements maintained by the authenticator (FIG. 1, 104). In general, the authenticator 104 maintains owner data 530 and owner collection data 531. OwnerID 502, 505 is information that uniquely identifies the owner. For example, OwnerID 502, 505 may be a unique number. Digest 503 is a compressed representation of an owner's collection. For example, the digest may be a 16-byte value computed by performing a hash algorithm on the binary representation of the owner's collection, or any information that identifies the collection (or subcollection) such as a list. Computing a digest is discussed in more detail below. Collection 504 is an optional list of individual items belonging to the owner.

Owner collection data 531 may include an item type 506 which identifies the type of virtual property. The type of virtual property is generally defined by the provider 103, for example, a virtual trading card. ItemID 507 is the identification for a specific item within an item type. ItemCount 508 is the number of a particular type of items in an owner's collection. If the ItemID represents a unique item, the ItemCount assumes a value of 1.

As shown in FIG. 5B, provider data 510 includes both owner registration data 532 and a virtual property item definition 533. Registration data 532 includes OwnerID 511 which is informnation, such as a number, that uniquely identifies the owner. Key 512 is used to encrypt and authenticate communications. Key 512 may be, for example, a 16-byte secret key value known only to the owner 102 and the provider 103. Communication using keys will be explained further below with reference to FIG. 8.

Virtual property item definition 533 may be stored in provider 103 and may include an ItemType 513 identifier that identifies the type of virtual property. ItemID 514 may be a specific item of an item type, such as a trading card (the item type) called "Roger Clemens 1994". BinaryData 515 is data that defines the virtual property item. BinaryData 515 may include images, programs, software objects, multimedia data, or the like. BinaryData 515 may also contain rules indicating the privileges extended to the owner 102.

As shown in FIG. 5C, Owner data 520 may include owner data 534 and collection data 535. Owner data 534 may include an OwnerID 521, 525 that may be information that uniquely identifies the owner. Owner data 534 may include a Key 522 used to encrypt and authenticate communications. For example, Key 522 may be a 16-byte secret key value known only to an owner and provider. Digest 523 is a compressed representation of the owner's collection. The Digest 523 may be computed, for example, by performing an MD5 cryptographic algorithm on the binary data of the virtual property item or items, or any information that identifies the collection (or subcollection) such as a list. Methods for computing Digest 523 is discussed in more detail below. Collection 524 is a list of individual items belonging to the owner 102.

Alternatively, public key cryptography may also be used. In public key cryptography, each user has both a public key and a private key. A private key is used to decrypt messages and to sign messages from the user having the private key. The public key is provided to other users to encrypt messages to the user providing the public key. The public key is public, in that other users with the users public key can check a signature and verify as that requires the knowledge of the private key created by the user, but they themselves cannot forge messages from the user. Thus, the private key is used to provide signatures to messages. If public key cryptography is used, a system should be configured to store public keys of other systems with which the system communicates. It should be understood that any cryptographic system or combinations of cryptographic techniques may be used.

The owner 102 may include collection data 535, which includes an owner ID 525 that uniquely identifies the owner 102. Data 535 may also include an ItemType 526 which identifies the type of virtual property, such as a virtual trading card. Item ID 527 is a specific item of an ItemType. ItemCount 528 is the number of item of the same ItemID in an owner's collection. BinaryData 529 is data that defines the virtual property item such as images, programs, software objects, multimedia data, and the like.

A problem in such a virtual property system includes needing to track a large number of items within the system. For example, in a collectible card game, each player may have thousands of cards, and a successful game could have several hundred thousand players. When large numbers of virtual property items need to be tracked, a computer system having large amounts of disk space and memory would be required to store all of the virtual property items.

Centralized tracking should be available to detect forgery of virtual property items. Centralized tracking also provides security of a user's virtual property items because the centralized system used to validate an owner's virtual property items is itself a secure system. According to various embodiments of the invention, new systems and methods are disclosed for tracking large numbers of virtual property items using a very small database by representing the virtual property items with a cryptographic hash value or digest. Also, items must be tracked to guarantee their authenticity such that forgery of virtual property items is detected. Forgery should be detected in such a system to avoid forgery of items that may be used as the basis of a virtual property transaction. A cryptographic hash value may be computed for one or more virtual property items and compared to a hash value calculated independently to verify that virtual property items are authentic.

According to one embodiment, a cryptographic hash algorithm is provided that may condense all of the digital items belonging to a user into a block of data that is a fixed length regardless of the original data's size. This block of data is referred to as the hash value or digest. For example, the digest may be a fixed length of 16 bytes. Using this digest, a server such as authenticator 104 may store a virtually unlimited number of objects for a user without requiring hardware that is more powerful or a larger disk capacity. In one embodiment, digests are stored in a digest database 222, which may be any database, such as a relational database, object database, or flat file. Any database may be used. In one embodiment, the system uses the well-known MD5 algorithm available from RSA Data Security Incorporated. An MD5 algorithm that may be used by the present invention is described in more detail in Request for Comments (RFC) 1321 by R. Rivest (1992), which is incorporated herein by reference.

A hash (also known as a message digest) is typically a one-way function. A hash is considered a function because it takes an input message and produces an output. A hash is also considered a one-way function because it is not practical to determine what input corresponds to a given output. For a message digest function to be considered cryptographically secure, the function should be computationally infeasible to find a message that has a given prespecified message digest, and it similarly should be unlikely to find two messages that have the same message digest. A digest or hash algorithm takes an arbitrary-length message and produces a fixed-length hash or digest. MD5 algorithms are further described in the book *Network Security—Private Communication in the Public World,* by C. Kaufman et al., Prentice Hall (1995), which is incorporated herein by reference. It should be understood that other hash algorithms could be used.

A virtual property system may use one or more modules to verify the identity of an owner, provider, or broker or to verify virtual property items in an owner's collection. Modules may be software or hardware that perform one or more functions.

Figure 6:
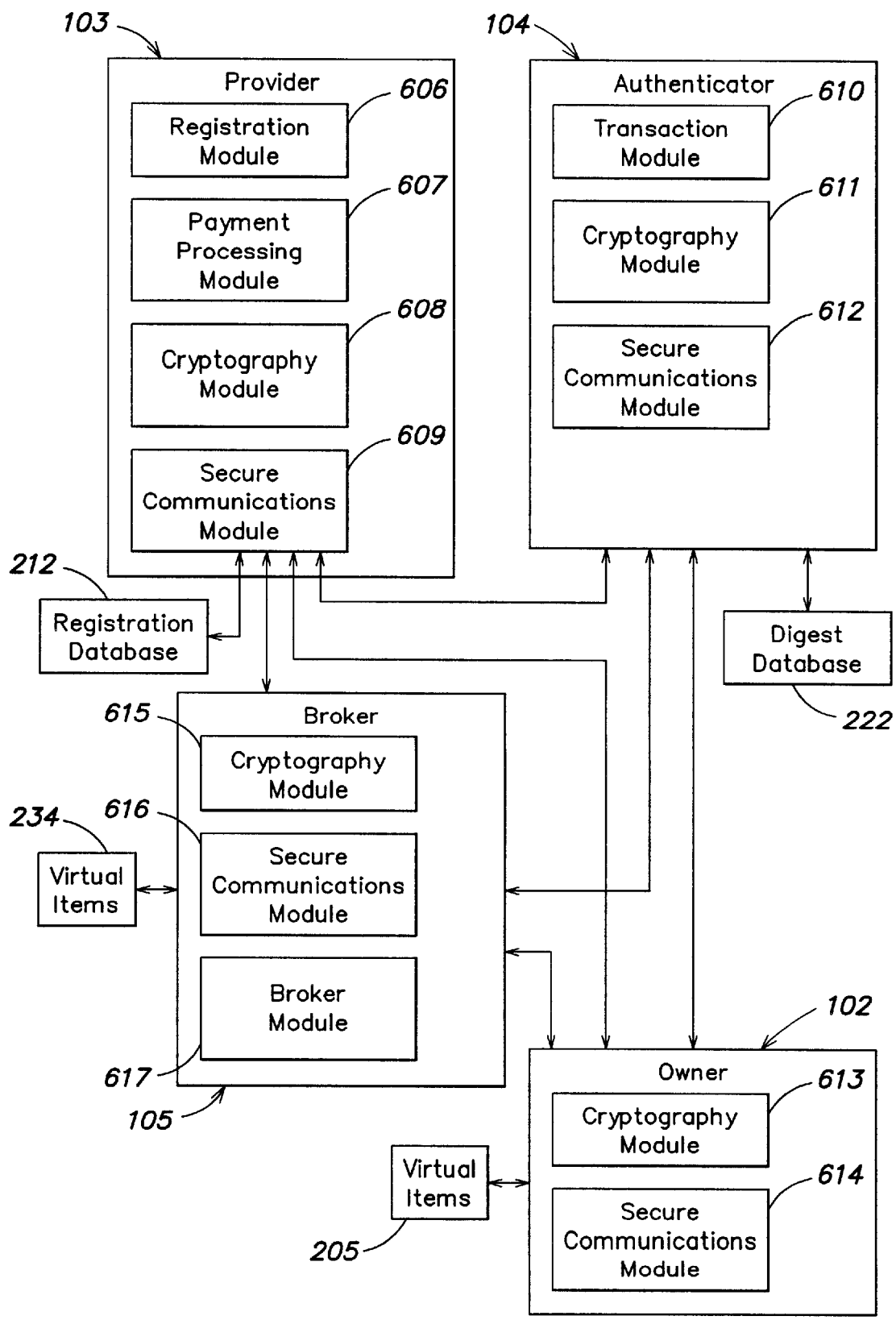
FIG. 6 is a block diagram showing relationships between the provider, authenticator, owner, and broker of FIGS. 5A, 5B and 5C.

FIG. 6 shows one embodiment showing more specifically system 400 components of FIG. 4. The provider 103 generally includes a registration module 618 that administers a database of users of virtual property items tracked by system 400. The data regarding users and their accounts is stored in registration database 212. Registration module 618 creates new accounts, and sets up secure communications using the secure communications module 609. Secure communications module 609 performs communications with other systems securely over a computer network. The secure communications module 609 may implement cryptographic functions to provide secure communications over a public or private communications network. The provider system 103 also includes cryptography module 608 which provides encryption/decryption algorithms and authentication of the owner systems. Provider system 103 also includes a payment processing module 607 which handles credit card transactions and other forms of payment.

Authenticator system 104 includes a transaction module 610 which executes transactions such as purchases, trades, and sales. Authenticator system 104 also includes a secure communications module 612 and a cryptography module 611 similar to those of the provider 601. Broker system 105, as discussed above with respect to FIG. 3, may perform trades between owners or may themselves purchase items for resale. Broker system 105 includes cryptography module 615 and secure communications module 616 that provide the same functionality as those of the provider 103 and authenticator systems 104. Likewise, owner system 102 also includes a cryptography module 613 and a secure communications module 614 to securely communicate with other systems. Broker system 105 also includes a broker module 617 and is used to buy, sell, and trade virtual property. Also as discussed above, broker systems 105 can handle transactions that require consignment of virtual property to a third party. For example, an owner system 102 could offer items for trade through a broker at a predetermined minimum value instead of performing a direct trade with another owner system 102.

Figure 7:
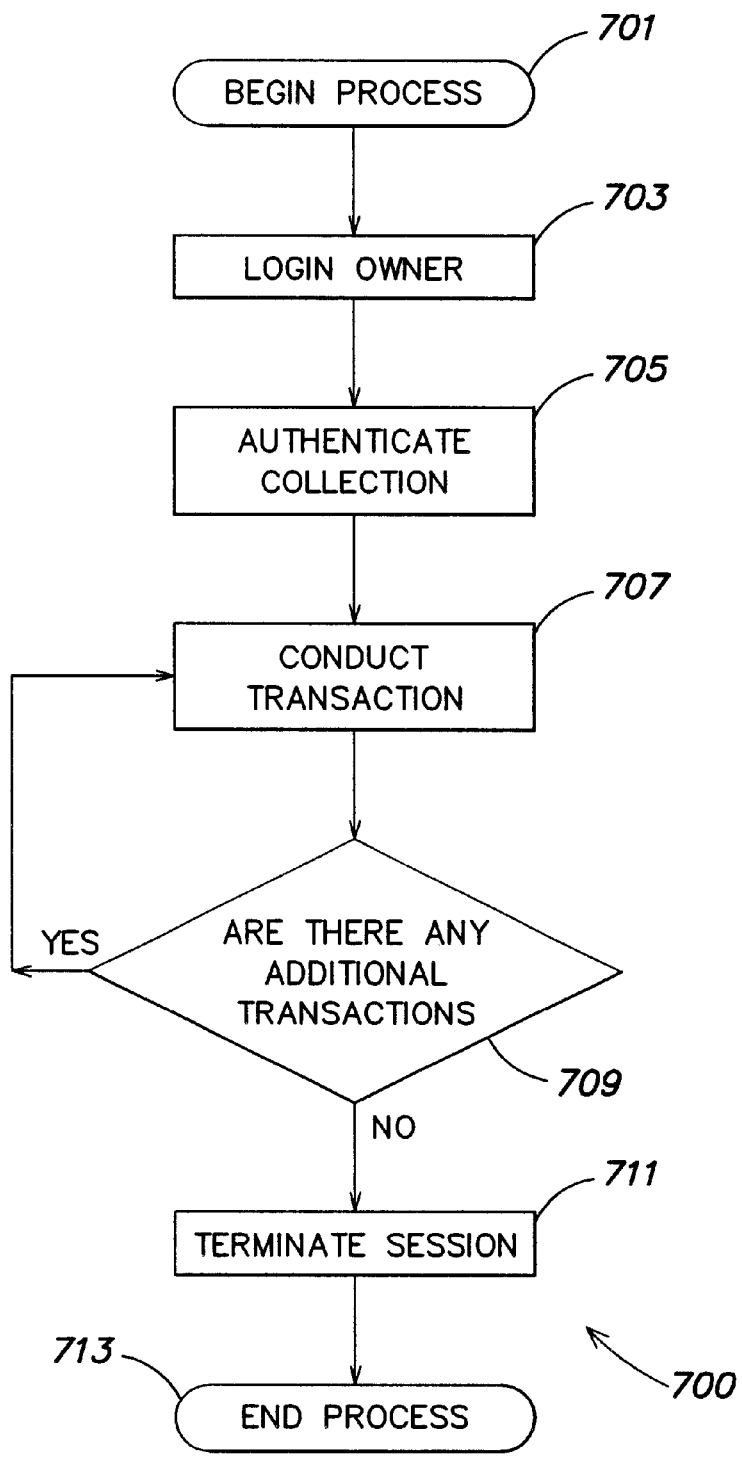
FIG. 7 is a flow chart of a process for conducting transactions.

FIG. 7 shows a process 700 for conducting transactions. At block 701, process 700 begins. At block 703, the owner attempts to log into the provider system 103 using some type of communications. Communications may be performed using modems, local area networks, or by using any method for communicating between different computers. For example, the owner system 102 may send a login request using the TCP/IP networking protocol. The owner system 102 requests a secure login from the provider 601, and the service is provided by the communications module 609. Methods for secure login to a system are well-known in the art. It should be understood that other methods for authenticating systems may be used.

Within step 703, an owner system 102 sends a request for a secure login from the provider in response to a user executing a login procedure at system 102. This service may be provided by the secure communications module 609. The owner system 102 transmits an OwnerID 521 assigned to the owner 603 to the provider 601 along with a block of random data encrypted with the owner's key 522. Preferably, the method of encryption is cryptographically strong. A cryptographically strong method is a method that produces an encryption that is nearly impossible to decode, even for a professional cryptanalyst. Encryption may be performed using, for example, the data encryption standard (DES) which is a well-known method of encryption, published in 1977 for use in commercial and unclassified U.S. government applications. It should be understood, however, that any degree of security may be used.

A cryptographic algorithm generally converts unencrypted information into encrypted information for storage or transmission over a data network. More generally, the basic service provided by cryptography is the ability to send information between participants in a way that prevents others from reading it. A message in its original form is known as plain text or clear text. Encrypted information is known as ciphertext. The process for producing ciphertext from plain text is known as encryption. The reverse of encryption is called decryption. Cryptographic systems generally involve both an algorithm and a secret value. The secret value is known as the key.

Secret key cryptography involves the use of a single key. Given a message (plain text) and the key, encryption produces unintelligible data (ciphertext). Decryption is the reverse operation of encryption and uses the same key as encryption. Cryptography is well-known in the art, and any method of encryption may be used with system 600. DES and other cryptography systems and concepts are described in more detail in the book *Network Security— Private Communication in a Public World,* by C. Kaufman et al., Prentice Hall (1995), which is incorporated herein by reference. It should be understood that other cryptography systems may be used.

At block 705, the system 102 authenticates collection with the authenticator system 104. A process for authenticating the collection is described in more detail below with reference to FIGS. 9A and 9B. At step 707, the owner system 102 is allowed to conduct a transaction on behalf of a user. As described above, the transaction may involve purchasing, trading, or selling virtual property items wherein virtual property and/or payment may be transferred between systems. At step 709, it is determined if there are any additional transactions to be performed by the owners system 102. If there is, the system 103 allows the user to conduct additional transactions at step 707. The provider system 103 issues a new transaction code when the previous transaction is complete. The owner 102 then uses the new transaction code for subsequent communications during the new transaction. If not, the system terminates the owner's session at block 711. At block 713, process 700 ends.

Figure 8:
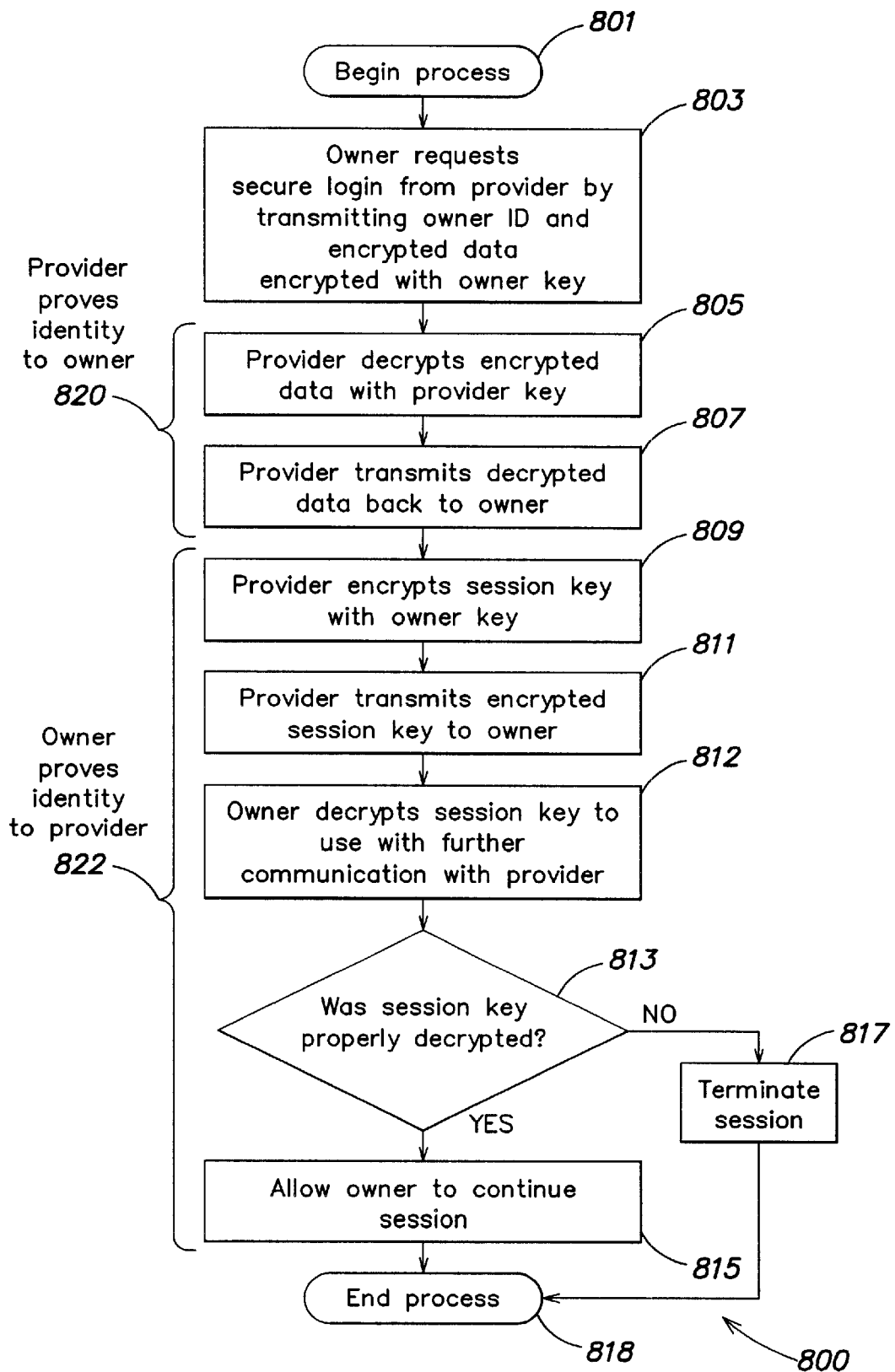
FIG. 8 is a flow chart of an authentication process.

FIG. 8 shows a process 800 for logging the user operating an owner system 102 into system 300, which is an expansion of step 703 of FIG. 7. At step 801, process 800 begins. At block 803, the owner system 102 requests secure log in from the provider system 103 by transmitting the OwnerID 521 and data encrypted with the owner's key 522. The provider system 103 proves its identity to the owner system 102 at steps 805 and 807, by decrypting the encrypted data with the provider Key 512 which is a copy of the Owner's Key 522. The provider system 103 decrypts the random block of data, and transmits the decrypted data back to the owner system 102. If the data was decrypted by the provider system 103 correctly, then the provider system 103 has proved its identity to the owner system 102 because the provider system 103 was capable of decrypting the random data.

The owner system 102 proves identity to the provider system 103 in section 822. At step 809, the provider system 103 encrypts a session key with the Owner's Key 522 and transmits the encrypted session key back to the owner system 102 at step 811. At step 812, the owner system 102 decrypts the encrypted session key and uses the decrypted session key for subsequent communications with the provider system 103. At step 813, the provider determines if the session key was properly decrypted by the owner system 102. If so, the provider 103 allows the owner 102 to continue a session at block 815. If not, the provider 103 terminates the session at block 817. At step 818, process 800 ends.

Subsequent communications may be encrypted with the session key or have a message authentication code (MAC) appended to them. A MAC is also referred to as a message integrity code (MIC). A MAC is created by prepending the session key to the message to be transmitted, performing a cryptographic hash algorithm to digest the key and message into a MAC, and then transmitting the message and MAC to the other party without sending the session key. The MAC may be, for example, a 16-byte value. The other party then prepends the key to the message, calculates its own MAC, and compares it to the MAC received with the message. If the MAC matches, then the message sender has sufficiently proved that it has the correct session key and that the message was not tampered with since the MAC was created.

The type of message authentication code (MAC) used by the virtual property system is not important as long as the authentication provided is reasonably secure. Whether a system is reasonably secure depends upon the application of the system. For example, as Internet game not involving items with great value may require much less security than a financial transaction system that transfers stock certificates.

Different MAC types may be used depending on the amount of security that is desired. The method may be employed as follows:

The two communicating parties already share a secret key K, a random value that may be, for example, 16 bytes.

The key is prepended to the message M to be sent, which is represented as K,M

A hash function H is executed on the key and message data together H(K,M) to produce a digest D.

The digest D is used as a MAC by appending it to the message and the result M,D is transmitted to the other party.

There are certain types of cryptographic attack that can theoretically compromise this type of authentication code, so an improved MAC may be used. For example, the following MAC construction that performs a hash function twice is more secure than a single hash function such as the function H(K,H(K,M)). Also, there are other MAC algorithms such as a CBC-MAC that may be used that employ encryption steps and provide additional security. MAC algorithms and their improvements are described in more detail in the book entitled *Applied Cryptography,* by Bruce Schneier, John Wiley & Sons (1996), which is incorporated herein by reference. Another useful method is to include random information from previous messages in the MAC algorithm so a stream of data being transmitted from an attacker must be forged message by message in real time. Various other improvements to the cryptographic system may be contemplated.

Figure 9A:
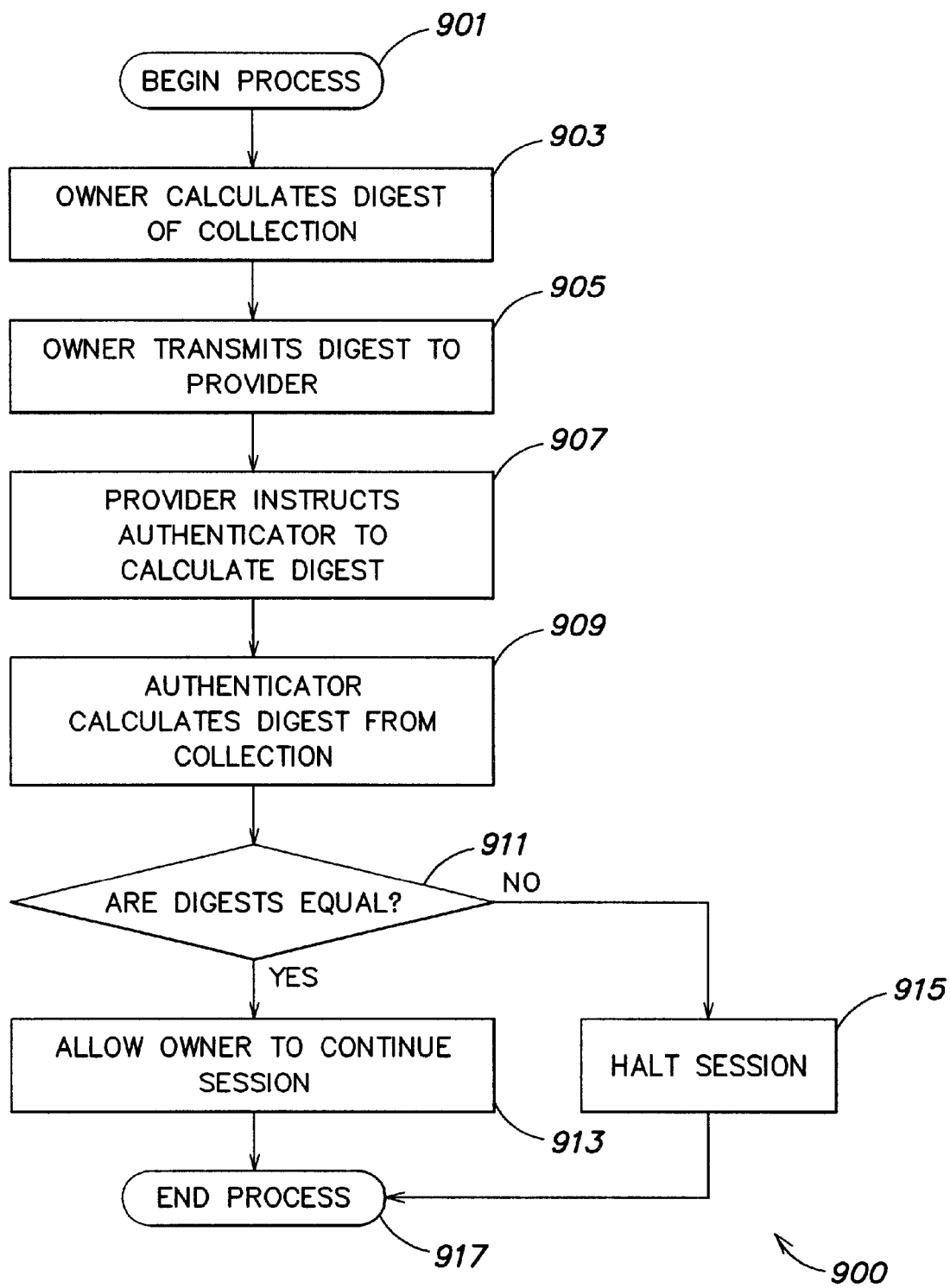
FIG. 9A is a flow chart of one process for authenticating a collection of virtual property items.
Figure 9B:
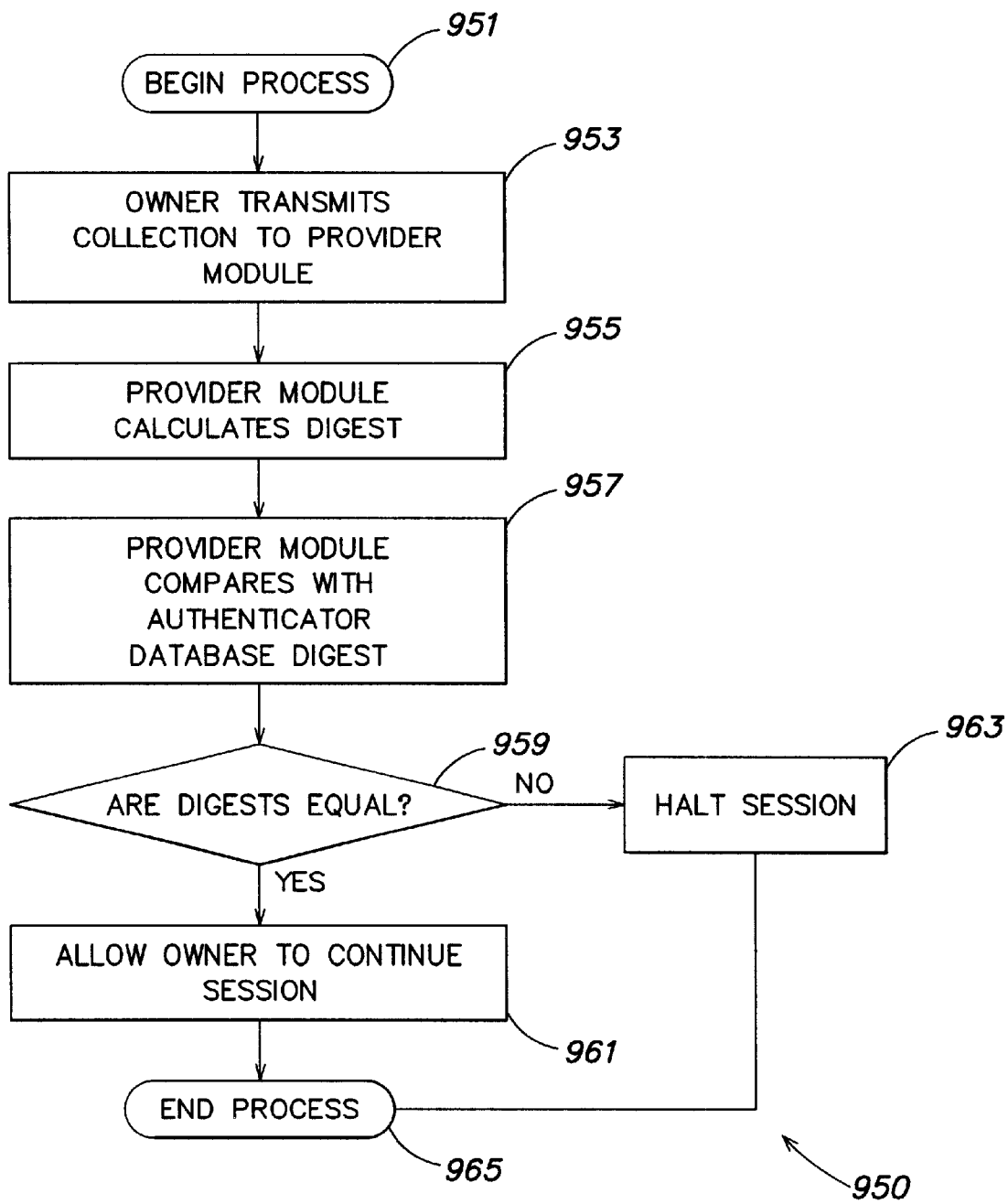
FIG. 9B is a flow chart of an alternate process for authenticating a collection.

FIGS. 9A and 9B show alternate processes of authenticating collection of virtual property items. At step 901, process 900 begins. At step 903, the owner system 102 calculates a digest of the collection of virtual items. At step 905, the owner 102 transmits the digest to the provider system 103. At step 907, the provider system 103 instructs the authenticator system 104 to calculate its own digest using a stored list of virtual property items of the owner system 102. At step 909, authenticator 104 calculates the digest to see if the values of the digest between the authenticator 104 and the owner 102 match. At step 911, if the authenticator 104 determines that the digests are equal, the provider 103 will allow an owner system 102 to continue a session at block 913. If the digests are not equal, the provider 103 will halt the session. At step 917, process 900 ends. Process 900 may be used in the case where the authenticator 104 stores a list of each item in the owner's collection.

FIG. 9B shows another process of authenticating an owner's collection. At step 951, process 950 begins. At step 953, an owner transmits its collection of virtual property items to provider 103. At step 955, provider 103 calculates a digest of the owner's collection. At step 957, the authenticator 104 compares the calculated digest with a database digest stored at the authenticator 104. If, at step 959, the digests are determined to be equal, the provider 103 will allow the owner 102 to continue the session at block 961. If not, the provider 103 will halt the session at 963. At step 965, process 950 ends.

The provider 103 may also request to validate a subset of an owner's collection. Once an owner 102 has defined one or more subsets, others can determine if a group of items is a valid subset of an owner's collection by transmitting a digest of the subset to the provider, which will then forward the request to the authenticator 104. The authenticator 104 then checks to see if the digest matches the full collection or any subset that has been defined by the owner 102.

Once communications have been secured, the owner 102 requests a session from the provider 103. A session is a series of communications used to perform one or more transactions. To start a session, the owner 102 and authenticator 104 make sure they agree on the items contained in the owner's collection.

Because only a digest value is stored at the authenticator, the authenticator can track many more items than conventional systems that store each item. This improvement, however, includes transmitting the owner's collection over the communication channel. To alleviate the performance implications of this operation, an owner 102 may split their full collection into smaller collections and specify which collection they wish to modify when they start a session. If the authenticator 104 and owner 102 agree on the items in the collection, the provider 103 transmits a transaction code to the owner 102 that must be included in the next request. This transaction code may be a random code that prevents a hacker from employing what is known as a replay attack.

In a replay attack, a third party snoops on the owner's communications, records each step in the session, and then replays the steps on the network. Even though the third party does not have the owner's secret key or session key, a third party can cause a transaction to be submitted multiple times if the data packets are exactly the same. Because a new transaction code is issued for each transaction and is expected to be included in the encrypted or MAC-authenticated message from the owner, a replay attack can be avoided. If the third party attempts to replay a past transaction, the data packets will not have the correct transaction code, and the transaction code cannot be forged because of the encryption or MAC.

Once a session has been started, a transaction is requested using the transaction code. The owner system 102 requests one of a number of allowed operations such as transferring some items to another owner's account, purchasing items, and the like. If items are being purchased, encrypted credit card information may be transmitted to the provider system 103 to be used for authorizing payment. The provider system 103 instructs the authenticator system 104 to validate the transactions of the owner and the authenticator system 104 informs the provider system 103 whether the transaction is acceptable.

If the transaction is acceptable to the authenticator system 104, the owner system 102 can confirm or cancel the transactions by generating a request to cancel the transaction including the transaction code. If the transaction is confirmed, the provider system 103 may perform steps such as instructing the authenticator system 104 to switch items to different accounts, authorize payment on credit cards, and generate new items in the owner's account for purchases. Once the provider system 103 has completed the transaction and confirmed that the authenticator system 104 has recorded the transaction, the provider system 103 transmits a new digest value of the collection to the owner system 102 for confirmation. The provider system 103 may also transmit any new items that the owner system 102 can add to their collection.

An owner system 102 can request multiple transactions in a session. Each time the provider system 103 acknowledges a transaction, it provides the owner system 102 with a new transaction code and expects the next request to contain that code. When the owner system 102 is finished, either the owner request that the session be terminated, or the provider system 103 terminates the session.

At any time during a session, an owner may request that the provider system 103 transmit the binary data associated with an item to the owner system 102. The provider system 103 may withhold some pieces of the binary data if the owner system 102 does not have complete privileges to access all parts of the virtual property. The system may include a mechanism through which owners check to see if their binary data is updated. The system may allow an owner system 102 to request updates for specific items if there is modified BinaryData block available for them.

Details of the MD5 algorithm are publicly available. A one-way hash function H(M) may be used where M is a block of data (message) of any size and the function outputs a single, fixed-length digest block D that is usually 16 or 32 bytes in length. Although the hash function can be replaced by any cryptographic one-way hash function (SHA, RC4, etc.) or even a simple checksum value, the strength of the system's security is dependent on the following features:

Reversing the function, i.e., deriving the original data from its digest, should be virtually impossible The function should be as collision-free as possible; different blocks of data should not produce the same digest value The following code is an example of Microsoft C++ code implementing various aspects. For example, collections of virtual property items may be transmitted between client. and server components using the following data structures:

The system may use a C++ class to store an owner's collection in memory. The following C++ code provides functions for manipulating the list. The object class is referred to as CBCollection and may be used to copy a collection.

```
class CBCollection
    {
    public:
        // constructor that copies a collection (or part of a collection)
        // and saves a pointer to the result in member m_pObjList
        CBCollection(const CS_OBJLIST* copyfrom, UINT start,
        UINT num);
        // function that calculates the digest on the stored collection
        // returns zero on error, otherwise length of digest
        UINT CreateDigest(LPBYTE digestbuffer, UINT buffersize) const;
    private:
        // member that stores the actual collection
        PCS_OBJLIST m_pObjList;
    };
```

```
// CS_OBJECT represents a single collectible item ID (either a unique item, or if
// objcount is greater than one, a type of item)
typedef struct _CS_OBJECT
    {
    CS_UNID     objid;      // CS_UNID is a 32-bit unsigned integer
    UINT32      objcount;   // number of items owned of this type (1 if unique item)
    }
    CS_OBJECT, *PCS_OBJECT;
// CS_OBJLIST represents a collection of items, all of a single item type
typedef struct _CS_OBJLIST
    {
    CB_ITEM_TYPE    listtype;       // integer item type
    UINT32          numentries;     // number of entries in array that is appended
    CS_OBJECT       objlist[ ];     // simple array of CS_OBJECT appended to struct
    }
    CS_OBJLIST, *PCS_OBJLIST;
```

The CreateDigest function may be performed in C++ code is as follows:

```
UINT CBCollection::CreateDigest(LPBYTE digestbuffer, UINT buffersize) const
    {
    // GHashFunction is a class that implements the one-way hash function
    // The DigestSize( ) method allows us to replace the function without
    // assuming that the new function will also produce a 16-byte digest
    GHashFunction hasher;
    UINT outputsize = hasher.DigestSize( );
    // make sure caller has provided enough room to store result in their buffer
    if (outputsize > buffersize)
        return 0;
    // set caller's buffer to all NULL bytes
    ZeroMemory(digestbuffer, buffersize);
    // if there are any items in the collection, calculate their digest
    // using a method of the GHashFunction class
```

```
            if (m_pObjList->numentries > 0)
            {
                // note that digest is calculated on the array of CS_OBJECTs and the
                // length is calculated as the size of a CS_OBJECT times the number of
                // entries that are known to be in the array
                hasher.CalculateDigest(digestbuffer,
                            (LPBYTE) m_pObjList->objlist,
                            sizeof(CS_OBJECT) * m_pObjList->numentries);
            }
            return outputsize;
        }
// Function header of the CalculateDigest method
void GHashFunction::CalculateDigest(BYTE* digest, const BYTE* input, int length)
        {
            // passes input data to MD5 algorithm or other hash function
            // and puts results into 'digest' buffer
        }
```

It should be understood that the aforementioned data structures and C++ code are examples of how one could implement various embodiments of the invention, and these examples should not be limiting.

There are many applications of a virtual property tracking system. For example, FIG. 10 shows one embodiment of a system 1000 for exchanging stock issues on-line. Systems perform transactions through broker components. The broker components track outstanding buy, sell, and trade requests placed by owners. The system 1000 may include a server 1001 which executes both an authenticator 1010 and provider 1011 components. A single provider may provide virtual property such as stock issues; each issue may be a separate item type or each issue may be defined as individual items of a single type. Electronic brokerage houses may execute trades on behalf of their clients, who communicate with the brokerage houses through a system that performs as an owner. For example, an on-line brokerage firm may provide on line brokerage application software 1003 for a computer system that executes an owner component 1018.

In a similar manner, a provider and broker may be combined in a single system 1006 to enable a server 1004 having an owner component 1019 to provide the ability to trade virtual property such as virtual stocks and bonds. Server 1004 may allow a user to access the owner component 1019 to perform trades and the like over a communication network 1017. Communication network 1017 may be, for example, a dialed connection between system 1004 and system 1005 using serial lines and modem devices. Advantageously, the owner system 1004 may keep track of multiple users that access the owner system 1004 through applications such as web browser 1005. System 1000 may utilize one or more communication links 1013, 1014, 1015, 1016, or 1017, to transfer information between owners (1018, 1019), providers (1011, 1020, 1023), and brokers (1012, 1021, 1024). Further, a local area network 1009 may be used to connect these systems.

Yet another embodiment is a virtual reality game that includes collectibles such as collectible cards. These games are also known as collectible card games (CCGs). Such a game includes the Chron X collectible card game available from Genetic Anomalics, Inc. A system that could support such a game is shown in FIG. 11. In a collectible card game, a user 1118, 1199 (player) purchases trading cards in random packs to create a collection and then uses the collection of these cards to play the game. Because each player has a random assortment of cards in their collection, users are allowed to trade cards with other players and purchase additional random packs to get an assortment that provides the user the best strategic advantage in the game.

Because the game is a virtual reality game, the game is played on a user computer 1104, 1116 with no physical cards. A user's card collections 1120, 1121 may be, for example, stored on a storage medium of the computer 1104, 1116, including memory or disk storage. Collections 1120, 1121 and their cards may also be implemented as software objects created in an object-oriented software language. The game itself may be downloaded as software over a network and executed on the user computer 1104, 1116. The game may include a graphical user interface to present information regarding game play, card purchase, or trades. In one aspect, the graphical user interface is a browser program.

In one embodiment, a virtual property tracking system included in the collectible card system allows a system to distribute cards over public networks for use in playing the game. The virtual property system may provide authentication for each user and for the collectible cards that are used in the game. Authentication is provided such that the collectible cards can not be duplicated, forged, or used without permission by any other user.

Figure 11:
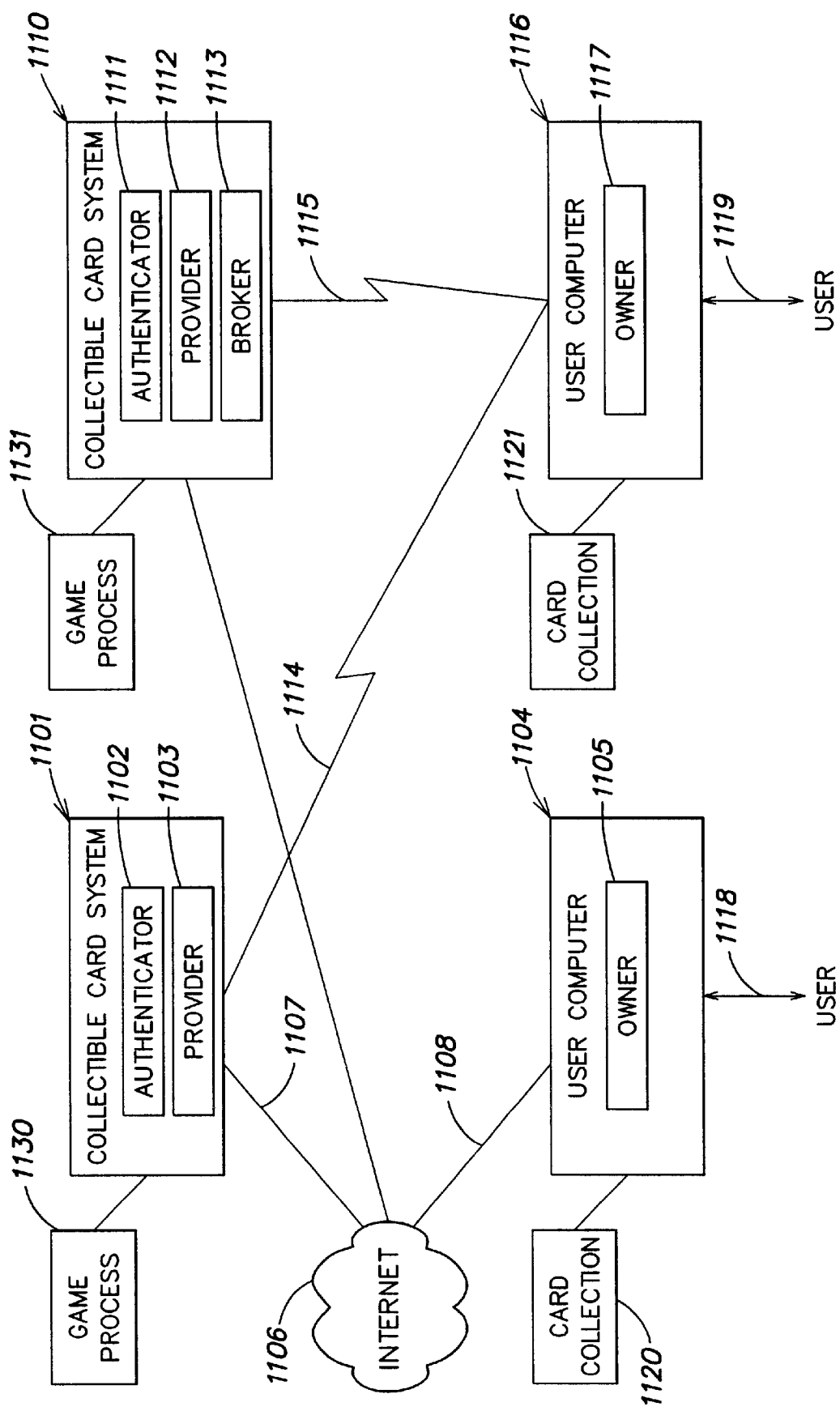
FIG. 11 is a block diagram of a system for managing virtual property items embodying other aspects of the invention.

FIG. 11 showvs a collectible card system 1101 that includes both an authenticator 1102 and a provider 1103. The collectible card system 1101 is accessible by users 1118, 1119 through networks including the Internet 1106 and other communication networks 1114, 1115 including dial-up lines, cable modems, or other communication systems. Typically, a user 1118 will access the collectible card system 1101 through a user computer 1104 which includes an owner system 1105. The user 1118 will register with the collectible card system 1101 such that the collectible card system 1101 creates an entry in a database that identifies the user 1118 as an entity that can own collectible cards.

A game process 1130 executing on system 1101 conducts the game. The game process 1130 interacts with the users 1118, 1119 to ensure that the rules of the game are followed and the state of game play is recorded. The game process 1130 may also facilitate communication between 1118, 1119. When a user 1118 enters a registration code in the game, a game process 1130 connects to system 1101 and authenticates the user 1118. Once authenticated, the user 1118 may, if he/she owns a card collection, play a game or register unregistered cards with system 1101. Unregistered cards may be obtained, for example, during an evaluation period or initial download of the collectible card game. A user 1118 may also purchase additional cards from system 1101 or trade cards with another user 1119. Such a trade could be accomplished by collectible card system 1110 which, in addition to components that are similar in function to those of system 1101, also includes a broker component 1113 which facilitates trading between systems. Specifically, system 1110 includes an authenticator 1111, provider 1112 and game process 1131 separate from that of system 1101. System 1110 includes a broker component 1113 to allow trades between systems 1101 and 1110, and thus will allow trades between users that have property items registered with different systems. The broker 1113 would facilitate trading by authenticating items to be traded with providers for both systems, items 1103 and 1112.

During a trade between users having items registered on the same system, each user indicates the user with whom they wish to trade, the cards that they are offering in trade, and the cards that they expect in return. When server 1110 receives two valid requests that match each other, i.e. the items that both sides expect to trade are equal, system 1110 will transfer virtual cards between the users 1118, 1119 using a communication protocol (e.g. TCP/IP).

Before playing a game or performing a trade, a virtual property tracking system may be used to prove to each user that their opponent is only using official, registered cards that they own. As cards are brought into play, game process 1130 may automatically query provider 1103 to verify that the user actually owns the cards played. System 1101 can confirm that the cards are authentic without revealing cards in a player's collection to another player.

In system 1101, an authenticator 1102 will calculate its own digest using a stored list of virtual property items of the owner system 1105. The owner 1105, will calculate the digest of card collection 1120 and transmit that digest to system 1101. If the authenticator 1102 determines that the digest received from the owner 1105 and its own independently calculated digest are equal, provider 1103 will allow owner system 1105 (and user 1118) to continue a session with the game 1130. If the digests are not equal, system 1101 may halt game play or trading. Alternatively, the authenticator may only store a computed digest, and the owner may transfer card collection 1120 to system 1101 to calculate a digest. If the digest stored in the digest database of system 1101 matches that of the digest calculated from card collection 1120, the provider 1103 will allow the owner 1105 to continue game play or a trade.

While various embodiments of the present invention have been described above, it should be understood that they have been presented by way of example only, and not limitation. Thus, the breadth and the scope of the present invention are not limited by any of the above-described exemplary embodiments, but are defined only in accordance with the following claims and their equivalents.

What is claimed is:

1. A system for managing virtual property represented by an identification of virtual property items and associated data, comprising:
   a plurality of processes executing on one or more computer systems which exchange a digest, wherein the digest is a compressed representation of a plurality of virtual property items; and wherein the digest is obtained by at least one of the plurality of processes by combining indices associated with each of the plurality of virtual property items into a pre-hash index and performing a hashing function on the index to obtain the digest.

2. The system according to claim 1, wherein the plurality of processes include an owner process and a provider process which conduct a transaction involving the virtual property, wherein the transaction is permitted on the basis of a comparison of a digest of the owner process and a reference digest by the provider process.

3. The system according to claim 2, wherein the reference digest is stored in a database having a plurality of digests of owner processes.

4. The system according to claim 2, wherein the owner process performs as a broker to buy and sell virtual property to other owner processes.

5. The system according to claim 1, wherein the index is an array of virtual property items.

6. The system according to claim 1, wherein the hashing function is an MD5 flashing function.

7. A system for managing virtual property including one or more computer systems functioning as owner, authentication, and provider systems, the system comprising:
   a plurality of owners each having a collection of one or more virtual items, wherein each collection has an associated digest, the digest being a compressed representation of an owner's collection;
   an authenticator including a database of digests; and
   a provider which is configured to conduct a transaction with the one of the plurality of owners on the basis of a comparison between the digest of the authenticator database and the digest of the owner, wherein the owner provides its collection of one or more virtual items to the provider which calculates the associated digest.

8. The system according to claim 7, wherein the provider is configured to transfer one or more virtual items to the owner.

9. The system according to claim 7, wherein the owner is operable to generate a request to trade one or more virtual items with another owner and the provider is configured to verify the owner's collection.

10. The system according to claim 7, wherein at least one of the virtual items is a software object created in an object-oriented software language.

11. The system according to claim 10, wherein the software object is a digital representation of a collectible card.

12. The system according to claim 10, wherein the software object represents property having monetary value.

13. The system according to claim 10, wherein the software object represents a game token.

14. A system for managing virtual property items including one or more computer systems functioning as owner, authentication, and provider systems, the system comprising:
   an owner having a collection of one or more virtual property items and determining a digest according to the collection, wherein the digest is obtained by combining indices associated with each of the virtual property items into a pre-hash index and performing a hashing function on the index to obtain the digest;
   an authenticator including a database storing the digests of said plurality of owners; and
   a provider which is configured to sell one or more items to one of the plurality of owners and which determines a calculated digest from a transmitted collection of virtual items when the calculated digest matches a digest stored in the database associated with the one owner.

15. A method for managing a collection of virtual property items belonging to an owner and having an index associated therewith, the method comprising the steps of:
   determining a digest by performing a hash function on the index, the index being formed by combining indices associated with each of the virtual property items;
   sending the digest to a provider;

verifying the digest with an authenticator; and conducting a transaction session between the provider and the owner.

16. The method according to claim 15, wherein the step of determining includes a step of performing an MD5 hashing function on the index.

17. The method according to claim 15, wherein the index is an array of virtual items.

18. The method according to claim 15, wherein the index is a concatenation of a plurality of virtual item indices.

19. The method according to claim 15, wherein the index is a concatenation of a plurality of virtual item indices and an associated quantity of each of the virtual items.

20. The method according to claim 17, wherein the virtual items are software objects created in an object-oriented software language.

21. The method according to claim 18, wherein the virtual items are software objects created in an object-oriented software language.

22. A method for conducting transactions over a distributed network, the method comprising steps of:
   a) authenticating an owner system to a provider system;
   b) verifying the virtual property of the owner by performing steps of:
      1) computing a digest of a collection of virtual property;
      2) comparing the digest to a predetermined digest which tracks the collection, the predetermined digest being stored in a database of digests; and
   c) permitting the owner to perform a transaction involving the collection, wherein the transaction is a game play transaction and the method includes the step of verifying that the owner actually owns virtual properly items of the collection.

23. The method of claim 22, the authenticating step a) further including steps of:
   1) transmitting a session key encoded with a secret key from the provider to the owner; and
   2) decrypting the transmitted session key with the secret key;
   3) communicating information encrypted with the session key to the provider; and
   4) inspecting the information to determine if the owner has encoded the information with a proper key.

24. The method according to claim 22, the method further comprising a step of d) authenticating the provider to the owner.

25. The method according to claim 24, the authenticating step d) further including steps of:
   1) encoding information with a secret key;
   2) transmitting the encoded information to the provider;
   3) decoding the encoded information with the secret key and transmitting the information to the owner; and
   4) verifying that the provider decrypted the information with the proper key.

26. The method according to claim 22, the computing step b1) including steps of:
   a) combining indices of virtual property items into a pre-hash index; and
   b) performing a hashing function on the pre-hash index to obtain the digest.

27. The method according to claim 26, wherein the performing step b) includes the step of performing an MD5 hashing function on the pre-hash index.

28. A method for computing a digest from a collection of virtual property items, the method comprising steps of:

combining indices associated with each of the virtual property items into a pre-hash index; and performing a hashing function on the pre-hash index to obtain the digest.

29. A method for computing a digest from a collection of virtual property items, the method comprising the steps of:
   storing virtual property items in a database; and
   performing a hashing function on the database to obtain the digest.

30. A digital information product comprising a computer-readable medium computer logic recorded thereon for enabling at least one processor of a computer system to manage a plurality of digital property items, the digital information product being adapted by the computer system to perform an act of:
   creating a data structure representing a plurality of virtual property items having a plurality of indices, wherein the data structure is created from a pre-bash index, the pre-hash index being formed by the plurality of indices of virtual property, and wherein the data structure is formed by performing a hashing function on the pre-hash index.

31. The digital information product according to claim 30, wherein the data structure has a fixed length.

32. The digital information product according to claim 30, wherein the hashing function is an MD5 hashing function.

33. The digital information product according to claim 30, further comprising determining the data structure for a subset of the plurality of virtual property items.

34. The digital information product of claim 30, wherein the pre-hash index is formed by concatenating one or more of the plurality of indices of virtual property.

35. The digital information product of claim 30, wherein the pre-hash index is a database of virtual items.

36. A method for conducting transactions over a distributed network including one or more computer systems functioning as an owner, authenticator, and provider systems, the method comprising steps of:
   a) indicating, by a first owner, a second owner with whom to trade;
   b) indicating a trade defining a first set of one or more virtual property items offering to trade and a second set of one or more items which are expected in return for the first set,
   c) after both the first and second owner indicate that they wish to trade, confirming that both the first and second owner wish to execute the trade;
   d) transferring the virtual property items of the first set to the second owner;
   e) transferring the virtual property items of the second set to the first owner; and
   f) verifying that the first owner actually owns the first set of one or more virtual property items before conducting further transactions including the one or more virtual property items, wherein the step of verifying includes comparing a digest associated with the first set of one or more virtual property items with a predetermined digest, and refusing further transactions including the one or more virtual property items based on the result of the comparing step.

37. The method according to claim 36, further comprising a step of:
   verifying that the second owner actually owns the second set of one or more virtual property items before conducting further transactions including the one or more virtual property items.

38. The method according to claim 36, wherein the virtual property items of the first and second set are software objects created in an object-oriented software language.

39. A system for managing virtual property including one or more computer systems functioning as owner, authentication, and provider systems, the system comprising:
- a plurality of owners each having a collection of one or more virtual items, wherein each collection has an associated digest, the digest being a compressed representation of an owner's collection;
- an authenticator including a database of digests and configured to authenticate the owner system to another system; and
- a provider which is configured to permit a transaction involving the collection with the one of the plurality of owners on the basis of a comparison between the digest of the authenticator database and the digest of the owner, wherein the provider is configured to transfer one or more virtual items to the owner and wherein the owner is operable to generate a request to trade one or more virtual items with another owner and the provider is configured to verify the owner's collection by computing a digest of a collection of virtual property and comparing the digest to a predetermined digest which tracks the collection, the predetermined digest being stored in a database of digests, and wherein the owner provides its collection of one or more virtual items to the provider which calculates the associated digest.

40. The system according to claim 39, wherein the provider is adapted to transmit a session key encoded with a secret key to the owner, the owner is adapted to decrypt the transmitted session key with the secret key and communicate information encrypted with the session key to the provider, and the provider is configured to inspect the information to determine if the owner has encoded the information with a proper key.

41. The system according to claim 40, wherein the owner is configured to indicate a second owner with whom to trade, indicate a trade defining a first set of one or more virtual property items offering to trade and a second set of one or more items which are expected in return for the first set, and after both the first and second owner indicate that they wish to trade, both the first and second owner are configured to confirm that both the first and second owner wish to execute the trade.

42. The system according to claim 41, wherein the system further comprises:
- means for transferring the virtual property items of the first set to the second owner; and
- means for transferring the virtual property items of the second set to the first owner.

43. The method according to claim 42, wherein the system further comprises:
- means for verifying that the first owner actually owns the first set of one. or more virtual property items before conducting further transactions including the one or more virtual property items.

* * * * *